US008299865B2

(12) United States Patent
Nakamura et al.

(10) Patent No.: US 8,299,865 B2
(45) Date of Patent: Oct. 30, 2012

(54) QUADRATURE MODULATOR AND SEMICONDUCTOR INTEGRATED CIRCUIT WITH IT BUILT-IN

(75) Inventors: Takahiro Nakamura, Kodaira (JP); Taizo Yamawaki, Tokyo (JP); Takayasu Norimatsu, Tachikawa (JP); Takao Kihara, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 43 days.

(21) Appl. No.: 12/942,533

(22) Filed: Nov. 9, 2010

(65) Prior Publication Data

US 2011/0115571 A1 May 19, 2011

(30) Foreign Application Priority Data

Nov. 18, 2009 (JP) ................ 2009-262466

(51) Int. Cl.
*H04L 27/20* (2006.01)
*H03C 3/40* (2006.01)
(52) U.S. Cl. .............. 332/105; 332/103; 375/398
(58) Field of Classification Search ............. 332/103, 332/105; 375/298, 302, 307; 455/110; 331/37, 331/38, 42, 43
See application file for complete search history.

(56) References Cited

U.S. PATENT DOCUMENTS

| 6,853,690 | B1 * | 2/2005 | Sorrells et al. ............. 375/295 |
| 2007/0002968 | A1 * | 1/2007 | Pan ............................ 375/298 |

FOREIGN PATENT DOCUMENTS

JP 64-48557 A 2/1989

OTHER PUBLICATIONS

X. He et al., A 45nm Low-Power SAW-less WCDMA Transmit Moduoator Using Direct Quadrature Voltage Modulation, 2009 IEEE International Solid-State Circuits Conference, Digest of Technical Papers, pp. 120-121, 121a, Feb. 8-12, 2009.
T. Sowlati et al., Single-Chip Multiband WCDMA/HSDPA/HSUPA/EGPRS Transceiver with Diversity Receiver and 3G DigRF Interface Without SAW Filters in Transmitter / 3G Receiver Paths, 2009 IEEE International Solid-State Circuits Conference, Digest of Technical Papers, pp. 116-117, 117a, Feb. 8-12, 2009.

* cited by examiner

*Primary Examiner* — Ryan Johnson
(74) *Attorney, Agent, or Firm* — Mattingly & Malur, PC

(57) ABSTRACT

A quadrature modulator has first to fourth transistors, a first node, a second node, and a first output node. A non-inversion in-phase analog signal, an inversion in-phase analog signal, a non-inversion quadrature analog signal, and an inversion quadrature analog signal are supplied to input electrodes of the first to fourth transistors, respectively. Control electrodes of the first to fourth transistors respond to a non-inversion in-phase RF signal, an inversion in-phase RF signal, a non-inversion quadrature RF signal, and an inversion quadrature RF signal, respectively. Output electrodes of the first and second transistors are coupled to the first node, and output electrodes of the third and fourth transistors are coupled to the second node. A first high-pass filter is coupled between the first node and the first output node, and a second high-pass filter is coupled between the second node and the first output node.

18 Claims, 10 Drawing Sheets

| Item | Conventional | | This | Unit |
|---|---|---|---|---|
| | 50% LO | 25% LO | | |
| ZBB | 20 | 110 | 205 | ohm |

QUADRATURE MODULATOR AND SEMICONDUCTOR INTEGRATED CIRCUIT WITH IT BUILT-IN

CLAIM OF PRIORITY

The present application claims priority from Japanese patent application JP 2009-262466 filed on Nov. 18, 2009, the content of which is hereby incorporated by reference into this application.

FIELD OF THE INVENTION

The present invention relates to a quadrature modulator and a semiconductor integrated circuit with it built-in, and particularly relates to a technique useful for realizing low-noise characteristics, excellent linearity, and low power consumption.

BACKGROUND OF THE INVENTION

In information devices such as wireless communication devices, frequency mixing circuits are indispensable. Along with the progress of information devices, communication modules have been required to be downsized, and there have been increasing needs of a technique for cutting down the number of constituent components especially in wireless communication modules used for mobile phones and wireless LANs.

In a communication module for mobile phones, components such as a power amplifier (PA), a SAW (Surface Acoustic Wave) filter, a switch, and a duplexer have been generally needed in addition to an RFIC (RF semiconductor integrated circuit) for processing an RF signal. However, the SAW filter becomes an obstacle to cost reduction and downsizing of modules, and thus the SAW filter is desirably eliminated. However, in order to eliminate the SAW filter, it is necessary to reduce the noise of respective circuit blocks (a driver amplifier, a quadrature modulator, a D/A converter, a low-pass filter, and the like in a transmitter, and a low-noise amplifier, a down-converter, and the like in a receiver) configuring an RFIC.

In Non-patent Document 1, there is described a passive voltage mixer that is driven by a 25%-duty-cycle LO in order to eliminate a transmission SAW because a gilbert mixer that is an active current mixer generates a considerably-high level of noise. A non-inversion in-phase voltage (VI+), an inversion in-phase voltage (VI−), a non-inversion quadrature voltage (VQ+), and an inversion quadrature voltage (VQ−) are supplied to the sources of four MOS transistors of the passive voltage mixer, and the drains of the four MOS transistors are commonly coupled to an input terminal of a PA driver through a capacitor. It is described that the 25%-duty-cycle LO with quadrature phases drives the gates of the four MOS transistors to increase the input impedance of the PA driver.

In Non-patent Document 2, there is described an I/Q modulator including a two-level passive switch that is driven by a local frequency LO and a double-frequency 2LO in order to eliminate the SAW filter. At the first level, a non-inversion in-phase voltage (BBI+) is supplied to the sources of first and second MOS transistors, an inversion in-phase voltage (BBI−) is supplied to the sources of third and fourth MOS transistors, a non-inversion quadrature voltage (BBQ+) is supplied to the sources of fifth and sixth MOS transistors, and an inversion quadrature voltage (BBQ−) is supplied to the sources of seventh and eighth MOS transistors (in Non-patent Document 2, the description about application of the signals to the sources of the fifth to eighth MOS transistors is wrong). Further, at the first level, anon-inversion local frequency LOI+ is supplied to the gates of the first and fourth MOS transistors, an inversion local frequency LOI− is supplied to the gates of the second and third MOS transistors, a non-inversion local frequency LOQ+ is supplied to the gates of the fifth and eighth MOS transistors, and an inversion local frequency LOQ− is supplied to the gates of the sixth and seventh MOS transistors. Further, at the second level, the source of a ninth MOS transistor is coupled to the drains of the first and third MOS transistors, the source of a tenth MOS transistor is coupled to the drains of the second and fourth MOS transistors, the source of an eleventh MOS transistor is coupled to the drains of the fifth and seventh MOS transistors, and the source of the tenth MOS transistor is coupled to the drains of the sixth and eighth MOS transistors. Further, at the second level, a non-inversion double-frequency 2LO+ is supplied to the gates of the ninth and tenth MOS transistors, and an inversion double-frequency 2LO− is supplied to the gates of the eleventh and twelfth MOS transistors. A differential RF output signal is generated between the drains of the ninth and eleventh MOS transistors and the drains of the tenth and twelfth MOS transistors, and is converted into a single-ended output by On-Chip Baluns to be supplied to an input of a PA driver.

On the other hand, Patent Document 1 describes not the passive mixer described in Non-patent Document 1 or Non-patent Document 2, but a special transmission analog modulator. The analog modulator includes an analog shift register, a plurality of first MOS transistors, a plurality of second MOS transistors, a plurality of capacitors, an operation amplifier, a feedback capacitor, and a feedback MOS transistor. An in-phase component and a quadrature component of a transmission signal are alternately supplied to an input terminal of the analog shift register.

A plurality of outputs of plural cells which are coupled in series in the analog shift register are coupled to one ends of the plural capacitors through the source/drain routes of the plural first MOS transistors, and the other ends of the plural capacitors are commonly coupled to an inversion input terminal of the operation amplifier. The drain/source routes of the plural second MOS transistors are coupled between the one ends of the plural capacitors and the ground potential, and parallel circuits of the feedback capacitor and the feedback MOS transistor are coupled between an output terminal and the inversion input terminal of the operation amplifier. It is described that the plural first MOS transistors and the plural second MOS transistors are switched, so that multiplication can be performed using "+1" and "−1" instead of sine and cosine carrier waves. As described above, the special transmission analog modulator described in Patent Document 1 below is configured using a switched capacitor and a finite impulse response (FIR)-type band-pass filter.

Patent Document 1:
Japanese patent laid-open No. Hei 01 (1989)-048557 (Sho 64-048557)

Non-Patent Document 1:
Xin He et al, "A 45 nm Low-Power SAW-less WCDMA Transmit Modulator Using Direct Quadrature Voltage Modulation", 2009 IEEE International Solid-State Circuits Conference DIGEST OF Technical PAPERS, PP. 120-121, 121a. 8-12 Feb. 2009"

Non-Patent Document 2:
Tirdad Sowlati et al, "Single Chip Multiband WCDMA/HS-DPA/HSUPA/EGPRS Transceiver with Diversity Receiver and 3G DigRF Interface Without SAW Filter in Transmitter/3G Receiver Paths", 2009 IEEE International Solid- State Circuits Conference DIGEST OF Technical PAPERS, PP. 116-117, 117a. 8-12 Feb. 2009

SUMMARY OF THE INVENTION

Prior to the present invention, the inventors engaged in research and development of an RF semiconductor integrated circuit (RFIC) for SAW-less mobile phones which support the multiple modes of GSM/WCDMA/LTE. It should be noted that GSM is an abbreviation for Global System for Mobile communication, WCDMA is an abbreviation for Wide band Code-Division Multiple-Access, and LTE is an abbreviation for Long Term Evolution.

<<Configuration of Transceiver>>

FIG. 7 is a diagram for showing a configuration of a transceiver in which an RF semiconductor integrated circuit (RFIC) examined by the inventors prior to the present invention is mounted.

The transceiver shown in FIG. 7 includes an RFIC 311, a SAW filter 309, an RF power amplifier 310, a duplexer 302, and an antenna 301.

A transmitter of the RFIC 311 includes a D/A converter 304I for an in-phase component (I) of a transmission baseband signal, a low-pass filter 305I, a D/A converter 304Q for a quadrature component (Q) of a transmission baseband signal, and a low-pass filter 305Q. The transmitter of the RFIC 311 further includes a quadrature modulator (QMOD) 306, a programmable gain amplifier (PGA) 308, and a synthesizer (Synth) 307. The RFIC 311 further includes a receiver 303 and a digital interface (DigIF) 3110.

The digital interface (DigIF) 3110 is coupled to a baseband signal processing LSI (baseband processor) outside the RFIC 311, and transmission baseband digital signals having the in-phase component (I) and the quadrature component (Q) supplied from the baseband processor are applied to an input terminal of the D/A converter 304I and an input terminal of the D/A converter 304Q, respectively. Further, reception baseband digital signals having the in-phase component (I) and the quadrature component (Q) generated from outputs of the receiver 303 are supplied to the baseband processor through the digital interface (DigIF) 3110. Specifically, although not shown in FIG. 7, two A/D converters for converting reception baseband analog signals having the in-phase component (I) and the quadrature component (Q) into the reception baseband digital signals having the in-phase component (I) and the quadrature component (Q) are provided in an output unit of the receiver 303.

A transmission baseband analog signal having the in-phase component (I) and a transmission baseband analog signal having the quadrature component (Q) generated from an output terminal of the D/A converter 304I and an output terminal of the D/A converter 304Q, respectively, are supplied to one input terminal of a first mixer 306I of the quadrature modulator (QMOD) 306 and one input terminal of a second mixer 306Q, respectively. Further, a first RF local signal and a second RF local signal whose phases are shifted from each other by 90° and which are generated from the synthesizer (Synth) 307 are supplied to the other input terminal of the first mixer 306I of the quadrature modulator (QMOD) 306 and the other input terminal of the second mixer 306Q, respectively. Accordingly, a transmission RF signal having the in-phase component (I) is generated from an output of the first mixer 306I, and a transmission RF signal having the quadrature component (Q) is generated from an output of the second mixer 306Q, so that vectors of the both transmission RF signals are combined by an adder 3060. Thus, an RF transmission signal obtained by combining the vectors of the RF signals having the in-phase component (I) and the quadrature component (Q) is generated from an output of the adder 3060 of the quadrature modulator (QMOD) 306.

As described above, the transmission baseband analog signals having the in-phase component (I) and the quadrature component (Q) output from the D/A converter 304I and the D/A converter 304Q, respectively, can be frequency-converted into an RF transmission signal as an output of the quadrature modulator (QMOD) 306 by the transmitter of the RFIC 311 in a direct up-conversion method. Thus, an intermediate frequency transmission amplifying circuit and an intermediate frequency transmission frequency selecting filter as used for frequency conversion in a superheterodyne method can be eliminated, thus leading to reduction of a semiconductor chip area in the RFIC 311.

The RF transmission signal output from the quadrature modulator (QMOD) 306 is transmitted to a base station of the mobile phone through the programmable gain amplifier (PGA) 308, the SAW filter 309, the RF power amplifier 310, the duplexer 302, and the antenna 301. On the contrary, the RF reception signal from the base station of the mobile phone is received by the antenna 301 to be supplied to an input terminal of the receiver 303. The RF reception signal input by the receiver 303 can be frequency-converted into reception baseband analog signals having the in-phase component (I) and the quadrature component (Q) by the receiver 303 in a direct down-conversion method. As a result, an intermediate frequency reception amplifying circuit and an intermediate frequency reception frequency selecting filter as used for frequency conversion in a superheterodyne method can be eliminated, thus leading to reduction of a semiconductor chip area in the RFIC 311.

While a mobile phone in the GSM system employs the time-division duplex (TDD) in which the transmitter and the receiver use substantially the same frequency band in time division, a mobile phone in the WCDMA system employs the frequency-division duplex (FDD) in which the transmitter and the receiver simultaneously use high and low frequency bands. Accordingly, in the WCDMA system employing the frequency-division duplex (FDD), a band-pass filter is used for separating the frequency bands on the transmission side and the reception side from each other. However, it is difficult to completely separate the frequency bands on the transmission side and the reception side from each other even if the band-pass filter is used.

Accordingly, 3GPP (3$^{rd}$ Generation Partnership Project) which is a project for studying and preparing the specifications of a third-generation mobile phone system stipulates that electric power leaked between an output of a transmitter and an input to a receiver is suppressed to a certain value or smaller in the WCDMA system, in order to obtain the minimum reception sensitivity of a certain value or smaller. Therefore, a reception-side SAW filter is coupled between an output of a transmitter and an input of a receiver or between an output of a low-noise amplifier (LNA) of a receiver and an input of a frequency down-converter in a conventional system. However, in order to reduce the size and cost of a wireless communication device, it is necessary to eliminate the reception-side or transmission-side SAW filter, or to ease the specifications of the SAW filter.

Especially, in order to eliminate the transmission-side SAW filter, it is absolutely essential to reduce the noise of all circuit blocks (the D/A converters 304I and 304Q, the low-pass filters 305I and 305Q, the quadrature modulator 306, the programmable gain amplifier 308, and the RF power amplifier 310) of the transmitter. Among these blocks, the operation frequency of the quadrature modulator (QMOD) widely ranges from the low-frequency band of the transmission baseband signal to the RF frequency band of the transmission RF local signal. Thus, it has been difficult to filter the noise, and the low noise has been hardly realized. Further, the output amplitude of the quadrature modulator (QMOD) 306 is limited by input linear characteristics of the programmable gain amplifier 308. Also for this reason, the low noise has been hardly realized.

<<Gilbert Mixer as Quadrature Modulator>>

FIG. 14 is a diagram for showing a configuration of a gilbert mixer that is an active current mixer which was examined as the quadrature modulator (QMOD) 306 of the RF semiconductor integrated circuit (RFIC) by the inventors prior to the present invention shown in FIG. 7.

As shown in FIG. 14, the gilbert mixer that is an active current mixer includes twelve N-channel MOS transistors MA1 to MA12, two constant current sources I1 and I2, and two load resistors R1 and R2.

A non-inversion in-phase baseband signal voltage BBI and an inversion in-phase baseband signal voltage BBIB are supplied to the gate of the transistor MA1 and the gate of the transistor MA2, respectively, and the common source thereof is coupled to the ground potential through the constant current source I1. The drain of the transistor MA1 is coupled to the common source of the transistors MA5 and MA6, and a non-inversion in-phase RF local signal voltage LOI and an inversion in-phase RF local signal voltage LOIB are supplied to the gate of the transistor MA5 and the gate of the transistor MA6, respectively. The drain of the transistor MA2 is coupled to the common source of the transistors MA7 and MA8, and the inversion in-phase RF local signal voltage LOIB and the non-inversion in-phase RF local signal voltage LOI are supplied to the gate of the transistor MA7 and the gate of transistor MA8, respectively.

A non-inversion quadrature baseband signal voltage BBQ and an inversion quadrature baseband signal voltage BBQB are supplied to the gate of the transistor MA3 and the gate of the transistor MA4, respectively, and the common source thereof is coupled to the ground potential through the constant current source I2. The drain of the transistor MA3 is coupled to the common source of the transistors MA9 and MA10, and a non-inversion quadrature RF local signal voltage LOQ and an inversion quadrature RF local signal voltage LOQB are supplied to the gate of the transistor MA9 and the gate of the transistor MA10, respectively. The drain of the transistor MA4 is coupled to the common source of the transistors MA11 and MA12, and the inversion quadrature RF local signal voltage LOQB and the non-inversion quadrature RF local signal voltage LOQ are supplied to the gate of the transistor MA11 and the gate of the transistor MA12, respectively.

One end of the load resistor R1 is coupled to the drains of the transistors MA5, MA7, MA10, and MA12, and one end of the load resistor R2 is coupled to the drains of the transistors MA6, MA8, MA9, and MA11. The other end of the load resistor R1 and the other end of the load resistor R2 are coupled to a power supply voltage Vdd, a non-inversion RF transmission signal RF is generated from the one end of the load resistor R1, and an inversion RF transmission signal RFB is generated from the one end of the load resistor R2.

The transistor MA1, the transistor MA2, the transistor MA3, and the transistor MA4 convert the non-inversion in-phase baseband signal voltage BBI, the inversion in-phase baseband signal voltage BBIB, the non-inversion quadrature baseband signal voltage BBQ, and the inversion quadrature baseband signal voltage BBQB into baseband signal current, respectively.

In response to the non-inversion in-phase RF local signal voltage LOI, the inversion in-phase RF local signal voltage LOIB, the non-inversion quadrature baseband signal voltage BBQ, and the inversion quadrature baseband signal voltage BBQB, the transistors MA5, MA6, MA7, MA8, MA9, MA10, MA11, and MA12 control the inflow ratio of the baseband signal current of the transistors MA1, MA2, MA3, and MA4 into the load resistors R1 and R2. As a result, in the gilbert mixer as the quadrature modulator (QMOD) 306 shown in FIG. 14, the baseband signal is mixed with the RF local signal, and the non-inversion RF transmission signal RF and the inversion RF transmission signal RFB can be generated.

<<Noise Characteristics of Gilbert Mixer>>

FIG. 15 is a diagram for showing noise characteristics of the gilbert mixer shown in FIG. 14 that is an active current mixer as the quadrature modulator 306 which was examined by the inventors prior to the present invention. It should be noted that the noise characteristics shown in FIG. 15 were obtained by monitoring the noise of the quadrature modulator (QMOD) 306 of FIG. 14 at an RF reception frequency of 2.44 GHz which is different from an RF transmission frequency of 2.35 GHz by 90 MHz. An RF transmission frequency of 2.35 GHz and an RF transmission frequency of 2.44 GHz correspond to a low RF transmission frequency and a high RF reception frequency, respectively, in the frequency division duplex (FDD).

The vertical axis of FIG. 15 represents the inverse number of the S/N ratio of the gilbert mixer of FIG. 14, and the horizontal axis of FIG. 15 represents current consumption of the gilbert mixer of FIG. 14. As being apparent from FIG. 15, it is necessary to increase the current consumption of the gilbert mixer in order to reduce the noise level of the gilbert mixer.

In the gilbert mixer shown in FIG. 14, the noise of the transistors MA1, MA2, MA3, and MA4 which convert the baseband signal voltages BBI, BBIB, BBQ, and BBQB into baseband signal current is dominant. While current noise (N) of the MOS transistors MA1 to MA4 is proportional to the square root of a trans-conductance gm, current signals (S) of the MOS transistors MA1 to MA4 are proportional to the trans-conductance gm. Accordingly, the S/N ratios of the transistors MA1, MA2, MA3, and MA4 are proportional to the square root of the trans-conductance gm. On the other hand, the trans-conductance gm of the MOS transistors is directly proportional to the operating current of the MOS transistors.

Thus, as shown by the curve line of FIG. 15, the inverse number of the S/N ratio of the gilbert mixer of FIG. 14 is inversely proportional to the square root of the current consumption of the gilbert mixer. As a result, it has been found by the examination of the inventors prior to the present invention that in order to limit the S/N ratio of the gilbert mixer of FIG. 14 to a predetermined value or smaller, it is necessary to set the current consumption of the gilbert mixer at 40 mA or higher, leading to an increase in current consumption.

<<Passive Mixer as Quadrature Modulator>>

FIG. 16 is a diagram for showing a configuration of a passive mixer which was examined as the quadrature modulator (QMOD) 306 of the RF semiconductor integrated circuit (RFIC) by the inventors prior to the present invention shown in FIG. 7.

As shown in FIG. 16, the passive mixer includes four buffer amplifiers BF1, BF2, BF3, and BF4, and four N-channel MOS transistors M1, M2, M3, and M4.

The non-inversion in-phase baseband signal voltage BBI and the inversion in-phase baseband signal voltage BBIB are supplied to an input terminal of the buffer amplifier BF1 and an input terminal of the buffer amplifier BF2, respectively, and the non-inversion quadrature baseband signal voltage BBQ and the inversion quadrature baseband signal voltage BBQB are supplied to an input terminal of the buffer amplifier BF3 and an input terminal of the buffer amplifier BF4, respectively.

A non-inversion in-phase baseband signal output voltage output from the buffer amplifier BF1 and an inversion in-phase baseband signal output voltage output from the buffer amplifier BF2 are supplied to the source of the transistor M1 and the source of the transistor M2, respectively, and a non-inversion quadrature baseband signal output voltage output from the buffer amplifier BF3 and an inversion quadrature baseband signal output voltage output from the buffer amplifier BF4 are supplied to the source of the transistor M3 and the source of the transistor M4, respectively.

The non-inversion in-phase RF local signal voltage LOI and the inversion in-phase RF local signal voltage LOIB are supplied to the gate of the transistor M1 and the gate of transistor M2, respectively, and the common drain thereof is coupled to a first node N1 where a non-inversion in-phase RF transmission signal RFI is generated. The non-inversion quadrature RF local signal voltage LOQ and the inversion quadrature RF local signal voltage LOQB are supplied to the gate of the transistor M3 and the gate of transistor M4, respectively, and the common drain thereof is coupled to a second node N2 where a non-inversion quadrature RF transmission signal RFQ is generated.

The first node N1 and the second node N2 are directly coupled to an output node Nout through a first signal line and a second signal line, respectively, and the RF transmission signal RF is generated from the output node Nout. Accordingly, since the passive mixer shown in FIG. 16 does not include the MOS transistors which consume bias current such as those included in the gilbert mixer shown FIG. 14, the noise level can be reduced. However, it has been found by the examination of the inventors prior to the present invention that the passive mixer shown in FIG. 16 involves a problem related to linearity, as will be described later.

<<Linearity of Passive Mixer>>

FIG. 17 is a diagram for showing waveforms for explaining an operation of the passive mixer shown in FIG. 16 as the quadrature modulator 306 which was examined by the inventors prior to the present invention.

Specifically, in the passive mixer shown in FIG. 16, one of the transistor M1 and the transistor M2 to which the non-inversion in-phase baseband signal output voltage and the inversion in-phase baseband signal output voltage are supplied, respectively, and one of the transistor M3 and the transistor M4 to which the non-inversion quadrature baseband signal output voltage and the inversion quadrature baseband signal output voltage are supplied, respectively, are simultaneously turned on. The simultaneous on-states always occur in the passive mixer shown in FIG. 16.

FIG. 17 shows that in the former half and the latter half of the on-period of the transistor M1 in response to the high level of the non-inversion in-phase RF local signal voltage LOI, the transistor M3 is turned on in response to the high level of the non-inversion quadrature RF local signal voltage LOQ, and the transistor M4 is turned on in response to the high level of the inversion quadrature RF local signal voltage LOQB. However, in the former half and the latter half of the next on-period in the next period of the transistor M2 in response to the high level of the inversion in-phase RF local signal voltage LOIB, the transistor M4 is turned on in response to the high level of the inversion quadrature RF local signal voltage LOQB, and the transistor M3 is turned on in response to the high level of the non-inversion quadrature RF local signal voltage LOQ.

As a result, in the passive mixer shown in FIG. 16, short circuit of the in-phase baseband transmission signal and the quadrature baseband transmission signal always occurs between the first node N1 and the second node N2 through the output node Nout. Thus, in the passive mixer shown in FIG. 16, distortion of the signal waveform of the RF transmission signal RF generated from the output node Nout increases. As described above, it has been found by the examination of the inventors prior to the present invention that the passive mixer shown in FIG. 16 involves the problem related to linearity.

According to the driving method by a 25%-duty-cycle LO for the passive voltage mixer described in Non-patent Document 1, it has been found by the examination of the inventors prior to the present invention that the simultaneous on-states of the transistors can be prevented, but a circuit for generating a 25%-duty-cycle LO is additionally needed, leading to an increase in power consumption.

According to the driving method by a local frequency LO and a double-frequency 2LO for the passive voltage mixer described in Non-patent Document 2, it has been found by the examination of the inventors prior to the present invention that the simultaneous on-states of the transistors can be similarly prevented, but a circuit for generating a double-frequency 2LO is additionally needed, leading to an increase in power consumption.

The present invention has been achieved based on the result of the examination by the inventors prior to the present invention as described above.

Accordingly, an object of the present invention is to provide a quadrature modulator with low noise characteristics, excellent linearity, and low power consumption and a semiconductor integrated circuit with it built-in.

The above and other objects and novel characteristics of the present invention will be apparent from the description of the specification and the accompanying drawings.

The following is a summary of a representative aspect of the present invention disclosed in the specification.

Specifically, a representative embodiment of the present invention provides a quadrature modulator (QMOD) including a first transistor (M1), a second transistor (M2), a third transistor (M3), a fourth transistor (M4), a first node (N1), a second node (N2), and a first output node (Nout).

Each of the first transistor, the second transistor, the third transistor, and the fourth transistor includes an input electrode, an output electrode, and a control electrode, and a conductive level between the input electrode and the output electrode can be controlled in response to control voltage supplied to the control electrode.

A non-inversion in-phase analog signal (BBI), an inversion in-phase analog signal (BBIB), a non-inversion quadrature analog signal (BBQ), and an inversion quadrature analog signal (BBQB) are supplied to the input electrode of the first transistor (M1), the input electrode of the second transistor (M2), the input electrode of the third transistor (M3), and the input electrode of the fourth transistor (M4), respectively.

The control electrode of the first transistor (M1), the control electrode of the second transistor (M2), the control electrode of the third transistor (M3), and the control electrode of the fourth transistor (M4) can respond to a non-inversion in-phase RF signal (LOI), an inversion in-phase RF signal (LOIB), a non-inversion quadrature RF signal (LOQ), and an inversion quadrature RF signal (LOQB), respectively.

The output electrode of the first transistor (M1) and the output electrode of the second transistor (M2) are coupled to the first node (N1), and the output electrode of the third transistor (M3) and the output electrode of the fourth transistor (M4) are coupled to the second node (N2).

A first high-pass filter (HPF1) coupled between the first node (N1) and the first output node (Nout) and a second high-pass filter (HPF2) coupled between the second node (N2) and the first output node (Nout) are further provided (see FIG. 1).

The following is a summary of an effect obtained by a representative aspect of the present invention disclosed in the specification.

Specifically, according to the present invention, it is possible to provide a quadrature modulator with low noise characteristics, excellent linearity, and low power consumption and a semiconductor integrated circuit with it built-in.

DETAILED DESCRIPTION OF THE PREFERRED EMBODIMENTS

1. Summary of the Preferred Embodiments

Figure 1:
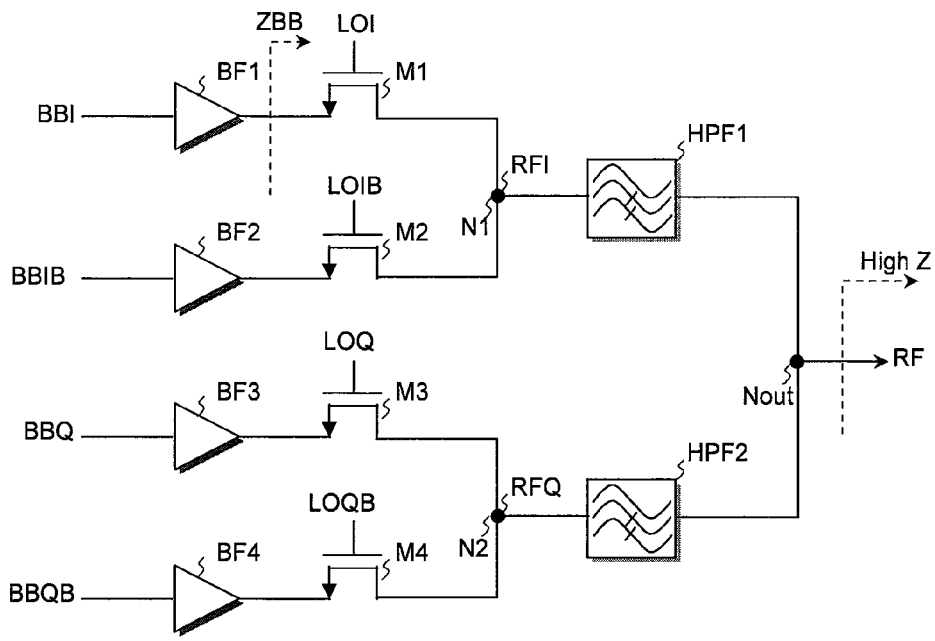
FIG. 1 is a diagram for showing a configuration of a passive mixer according to a second embodiment of the present invention which can be used as a quadrature modulator (QMOD) 306 included in an RFIC according to a first embodiment of the present invention shown in FIG. 7.

In the first place, the outline of representative embodiments of the present invention disclosed in this specification will be described. The reference numerals of the drawings which are referred to in parentheses in the description of the outline of the representative embodiments merely exemplify elements which fall into the concepts of constitutional elements given that are given the reference numerals.

[1] A representative embodiment of the present invention provides a quadrature modulator (QMOD) including a first transistor (M1), a second transistor (M2), a third transistor (M3), a fourth transistor (M4), a first node (N1), a second node (N2), and a first output node (Nout).

Each of the first transistor, the second transistor, the third transistor, and the fourth transistor includes an input electrode, an output electrode, and a control electrode, and a conductive level between the input electrode and the output electrode can be controlled in response to control voltage supplied to the control electrode.

A non-inversion in-phase analog signal (BBI), an inversion in-phase analog signal (BBIB), a non-inversion quadrature analog signal (BBQ), and an inversion quadrature analog signal (BBQB) are supplied to the input electrode of the first transistor (M1), the input electrode of the second transistor (M2), the input electrode of the third transistor (M3), and the input electrode of the fourth transistor (M4), respectively.

The control electrode of the first transistor (M1), the control electrode of the second transistor (M2), the control electrode of the third transistor (M3), and the control electrode of the fourth transistor (M4) can respond to a non-inversion in-phase RF signal (LOI), an inversion in-phase RF signal (LOIB), a non-inversion quadrature RF signal (LOQ), and an inversion quadrature RF signal (LOQB), respectively.

The output electrode of the first transistor (M1) and the output electrode of the second transistor (M2) are coupled to the first node (N1), and the output electrode of the third transistor (M3) and the output electrode of the fourth transistor (M4) are coupled to the second node (N2).

A first high-pass filter (HPF1) coupled between the first node (N1) and the first output node (Nout) and a second high-pass filter (HPF2) coupled between the second node (N2) and the first output node (Nout) are further provided (see FIG. 1).

According to the embodiment, it is possible to provide a quadrature modulator with low noise characteristics, excellent linearity, and low power consumption.

The quadrature modulator (QMOD) according to a preferred embodiment, a fifth transistor (M1B), a sixth transistor (M2B), a seventh transistor (M3B), an eighth transistor (M4B), a third node (N1B), a fourth node (N2B), and a second output node (NoutB) are further provided.

Each of the fifth transistor, the sixth transistor, the seventh transistor, and the eighth transistor includes an input electrode, an output electrode, and a control electrode, and a conductive level between the input electrode and the output electrode can be controlled in accordance with control voltage supplied to the control electrode.

The non-inversion in-phase analog signal (BBI), the inversion in-phase analog signal (BBIB), the non-inversion quadrature analog signal (BBQ), and the inversion quadrature analog signal (BBQB) can be supplied to the input electrode of the fifth transistor (M1B), the input electrode of the sixth transistor (M2B), the input electrode of the seventh transistor (M3B), and the input electrode of the eighth transistor (M4B), respectively.

The control electrode of the fifth transistor (M1B), the control electrode of the sixth transistor (M2B), the control electrode of the seventh transistor (M3B), and the control electrode of the eighth transistor (M4B) can respond to the inversion in-phase RF signal (LOIB), the non-inversion in-phase RF signal (LOI), the inversion quadrature RF signal (LOQB), and the non-inversion quadrature RF signal (LOQ), respectively.

The output electrode of the fifth transistor (M1B) and the output electrode of the sixth transistor (M2B) are coupled to the third node (N1B), and the output electrode of the seventh transistor (M3B) and the output electrode of the eighth transistor (M4B) are coupled to the fourth node (N2B).

Figure 2:
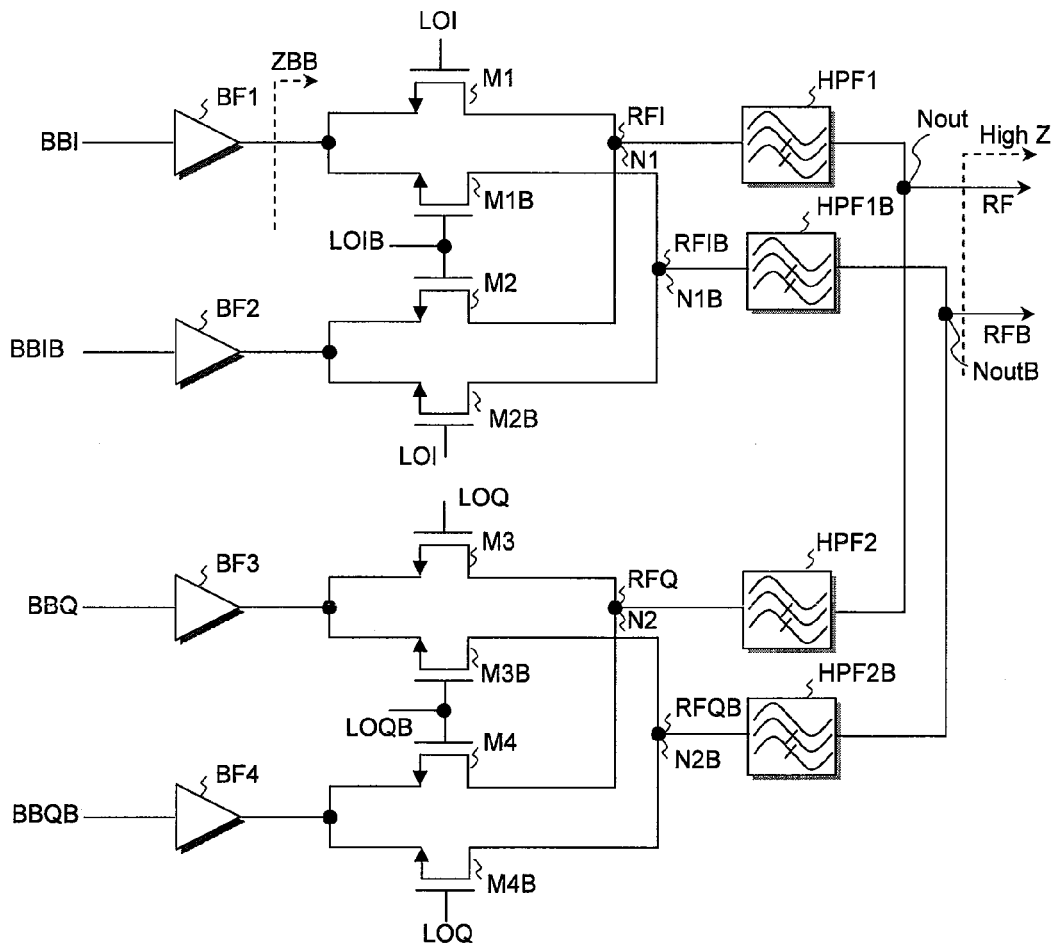
FIG. 2 is a diagram for showing a configuration of a passive mixer according to a third embodiment of the present invention which can be used as the quadrature modulator (QMOD) 306 included in the RFIC according to the first embodiment of the present invention shown in FIG. 7.

A third high-pass filter (HPF1B) coupled between the third node (N1B) and the second output node (NoutB) and a fourth high-pass filter (HPF2B) coupled between the fourth node (N2B) and the second output node (NoutB) are further provided (see FIG. 2).

Figure 4:
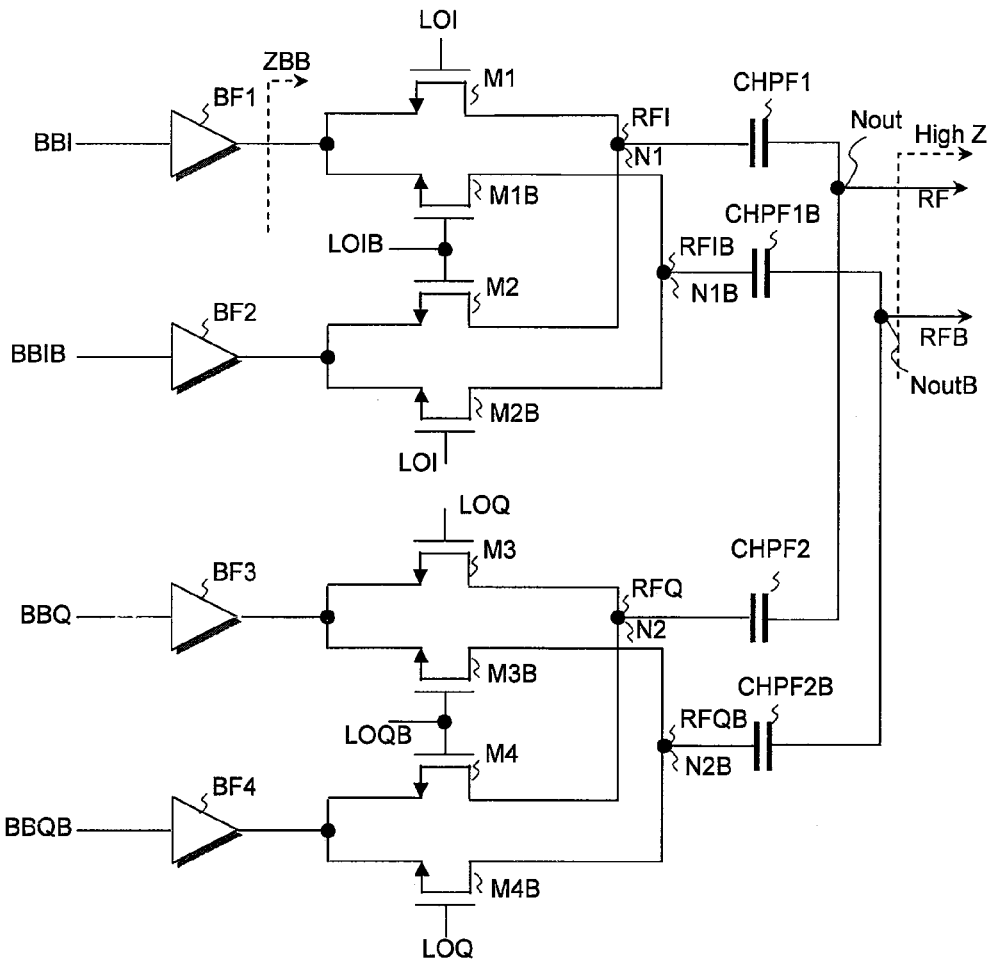
FIG. 4 is a diagram for showing a configuration of a passive mixer according to a fifth embodiment of the present invention which can be used as the quadrature modulator (QMOD) 306 included in the RFIC according to the first embodiment of the present invention shown in FIG. 7.

In another preferred embodiment, the first high-pass filter (HPF1) includes a first capacitor (CHPF1) coupled between the first node (N1) and the first output node (Nout), the second high-pass filter (HPF2) includes a second capacitor (CHPF2) coupled between the second node (N2) and the first output node (Nout), the third high-pass filter (HPF1B) includes a third capacitor (CHPF1B) coupled between the third node (N1B) and the second output node (NoutB), and the fourth high-pass filter (HPF2B) includes a fourth capacitor (CHPF2B) coupled between the fourth node (N2B) and the second output node (NoutB) (see FIG. 4).

In still another preferred embodiment, each of the first high-pass filter (HPF1), the second high-pass filter (HPF2), the third high-pass filter (HPF1B), and the fourth high-pass filter (HPF2B) has a cut-off frequency that is set between the maximum frequency of each of the non-inversion in-phase analog signal (BBI), the inversion in-phase analog signal (BBIB), the non-inversion quadrature analog signal (BBQ), and the inversion quadrature analog signal (BBQB) and the minimum frequency of each of the non-inversion in-phase RF signal (LOI), the inversion in-phase RF signal (LOIB), the non-inversion quadrature RF signal (LOQ), and the inversion quadrature RF signal (LOQB) (see FIG. 4).

The quadrature modulator (QMOD) according to a more preferred embodiment further includes a waveform processing circuit (LOPC) to which the non-inversion in-phase RF signal (LOI), the inversion in-phase RF signal (LOIB), the non-inversion quadrature RF signal (LOQ), and the inversion quadrature RF signal (LOQB) can be supplied.

The waveform processing circuit (LOPC) can generate a pulse-width-converted output/non-inversion in-phase RF signal voltage (LOI_O), a pulse-width-converted output/inversion in-phase RF signal voltage (LOIB_O), a pulse-width-converted output/non-inversion quadrature RF signal voltage (LOQ_O), and a pulse-width-converted output/inversion quadrature RF signal voltage (LOQB_O) in response to the non-inversion in-phase RF signal (LOI), the inversion in-phase RF signal (LOIB), the non-inversion quadrature RF signal (LOQ), and the inversion quadrature RF signal (LOQB), respectively.

Figure 12:
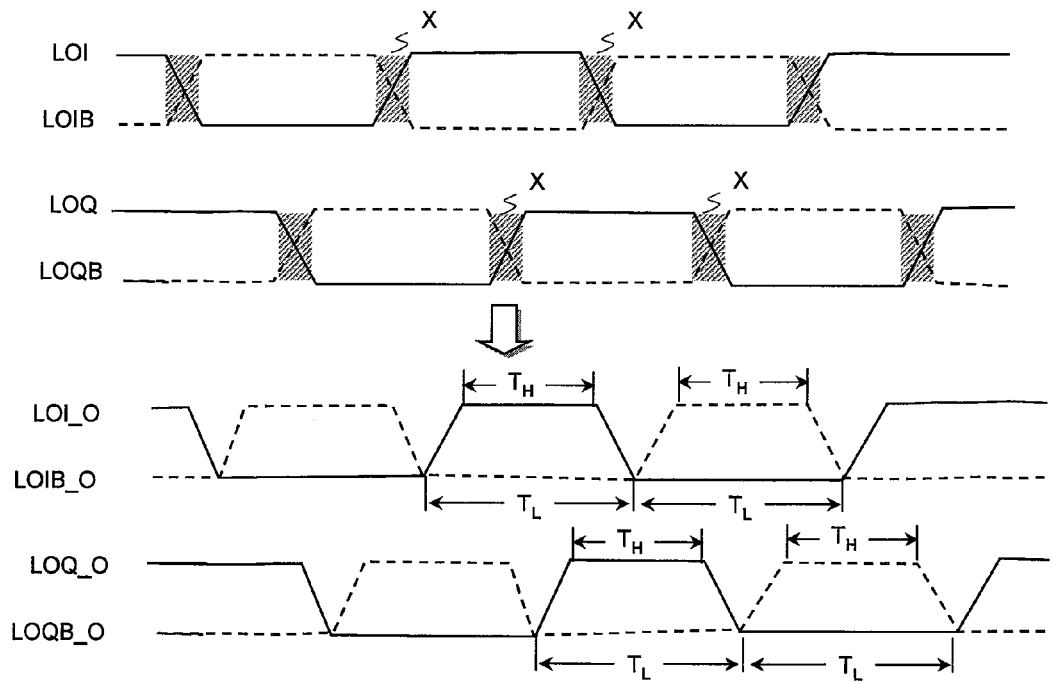
FIG. 12 is a diagram for showing waveforms of a non-inversion in-phase RF local signal voltage LOI, an inversion in-phase RF local signal voltage LOIB, non-inversion quadrature RF local signal voltage LOQ, and an inversion quadrature RF local signal voltage LOQB which are supplied to the local signal pulse-width reduction circuit LOPC of the passive mixer according to the sixth embodiment of the present invention shown in FIG. 5, and waveforms of a pulse-width-converted output/non-inversion in-phase RF local signal voltage LOI_O, a pulse-width-converted output/inversion in-phase RF local signal voltage LOIB_O, a pulse-width-converted output/non-inversion quadrature RF local signal voltage LOQ_O, and a pulse-width-converted output/inversion quadrature RF local signal voltage LOQB_O which are generated from the local signal pulse-width reduction circuit LOPC.

A high-level period ($T_H$) is set shorter than a low-level period ($T_L$) in each of the pulse-width-converted output/non-inversion in-phase RF signal voltage (LOI_O), the pulse-width-converted output/inversion in-phase RF signal voltage (LOIB_O), the pulse-width-converted output/non-inversion quadrature RF signal voltage (LOQ 0), and the pulse-width-converted output/inversion quadrature RF signal voltage (LOQB_O) (see FIG. 12).

The pulse-width-converted output/non-inversion in-phase RF signal voltage (LOI_O) generated from the waveform processing circuit (LOPC) can be supplied to the control electrode of the first transistor (M1) and the control electrode of the sixth transistor (M2B).

The pulse-width-converted output/inversion in-phase RF signal voltage (LOIB_O) generated from the waveform processing circuit (LOPC) can be supplied to the control electrode of the second transistor (M2) and the control electrode of the fifth transistor (M1B).

The pulse-width-converted output/non-inversion quadrature RF signal voltage (LOQ_O) generated from the waveform processing circuit (LOPC) can be supplied to the control electrode of the third transistor (M3) and the control electrode of the eighth transistor (M4B).

Figure 6:
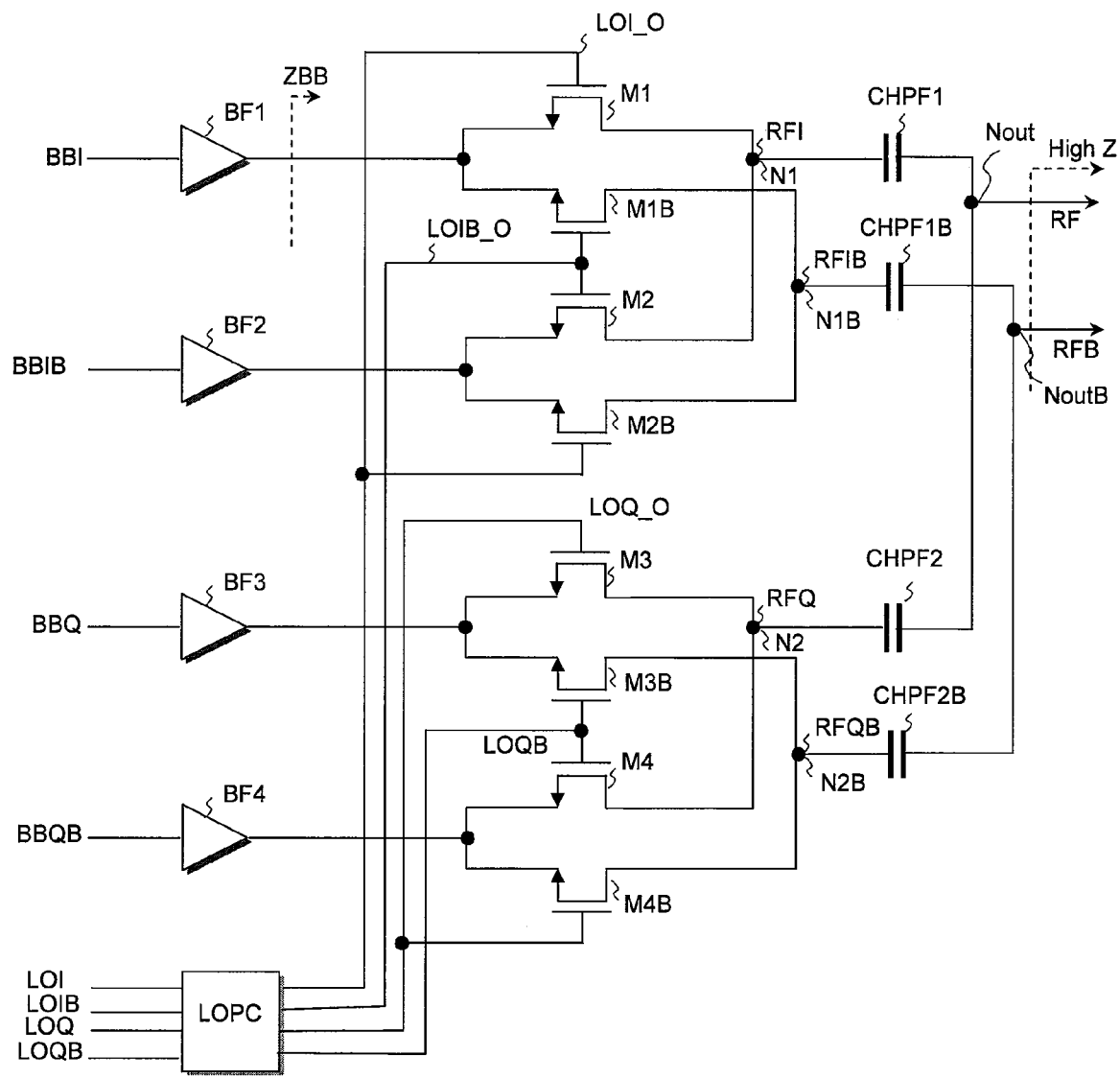
FIG. 6 is a diagram for showing a configuration of a passive mixer according to a seventh embodiment of the present invention which can be used as the quadrature modulator (QMOD) 306 included in the RFIC according to the first embodiment of the present invention shown in FIG. 7.

The pulse-width-converted output/inversion quadrature RF signal voltage (LOQB_O) generated from the waveform processing circuit (LOPC) can be supplied to the control electrode of the fourth transistor (M4) and the control electrode of the seventh transistor (M3B) (see FIG. 6).

In another more preferred embodiment, in the timing when the non-inversion in-phase voltage level of the pulse-width-converted output/non-inversion in-phase RF signal voltage (LOI_O) crosses over the inversion in-phase voltage level of the pulse-width-converted output/inversion in-phase RF signal voltage (LOIB_O), each of the non-inversion in-phase voltage level and the inversion in-phase voltage level is set lower than the threshold voltage of each of the first transistor (M1), the sixth transistor (M2B), the second transistor (M2), and the fifth transistor (M1B).

In the timing when the non-inversion quadrature voltage level of the pulse-width-converted output/non-inversion quadrature RF signal voltage (LOQ_O) crosses over the inversion quadrature voltage level of the pulse-width-converted output/inversion quadrature RF signal voltage (LOQB_O), each of the non-inversion quadrature voltage level and the inversion quadrature voltage level is set lower than the threshold voltage of each of the third transistor (M3), the eighth transistor (M4B), the fourth transistor (M4), and the seventh transistor (M3B) (see FIGS. 6 and 12).

The quadrature modulator (QMOD) according to still another more preferred embodiment further includes a first buffer amplifier (BF1), a second buffer amplifier (BF2), a third buffer amplifier (BF3), and a fourth buffer amplifier (BF4).

The non-inversion in-phase analog signal (BBI) can be supplied to the input electrode of the first transistor (M1) and the input electrode of the fifth transistor (M1B) through the first buffer amplifier (BF1).

The inversion in-phase analog signal (BBIB) can be supplied to the input electrode of the second transistor (M2) and the input electrode of the sixth transistor (M2B) through the second buffer amplifier (BF2).

The non-inversion quadrature analog signal (BBQ) can be supplied to the input electrode of the third transistor (M3) and the input electrode of the seventh transistor (M3B) through the third buffer amplifier (BF3).

The inversion quadrature analog signal (BBQB) can be supplied to the input electrode of the fourth transistor (M4) and the input electrode of the eighth transistor (M4B) through the fourth buffer amplifier (BF4) (see FIG. 6).

In a concrete embodiment, each of a non-inversion in-phase RF signal voltage generator, an inversion in-phase RF signal voltage generator, a non-inversion quadrature RF signal voltage generator, and an inversion quadrature RF signal voltage generator which generate the pulse-width-converted output/non-inversion in-phase RF signal voltage (LOI_O), the pulse-width-converted output/inversion in-phase RF signal voltage (LOIB_O), the pulse-width-converted output/non-inversion quadrature RF signal voltage (LOQ_O), and the pulse-width-converted output/inversion quadrature RF signal voltage (LOQB_O), respectively, of the waveform processing circuit (LOPC) is configured using a CMOS inverter (INV1).

The CMOS inverter of each of the signal voltage generators includes a P-channel MOS transistor (PM1) and an N-channel MOS transistor (NM1).

Figure 8:
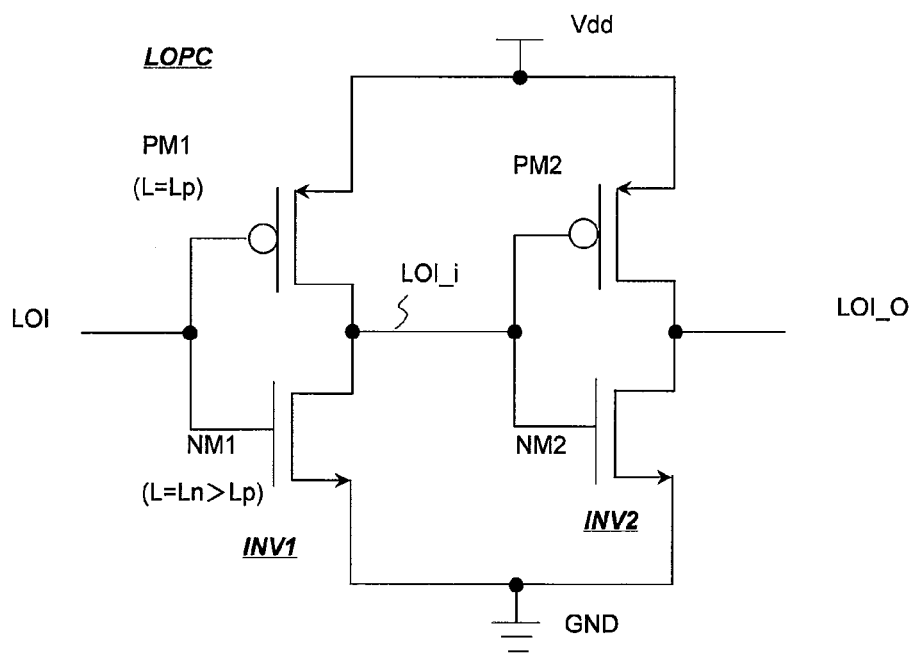
FIG. 8 is a diagram for showing a configuration of a local signal pulse-width reduction circuit LOPC included in the passive mixer according to the sixth embodiment of the present invention shown in FIG. 5.

An output terminal (LOI_i) of the CMOS inverter of the N-channel MOS transistor (NM1) is set lower in current driving performance than that of the CMOS inverter of the P-channel MOS transistor (PM1) (see FIG. 8).

In another concrete embodiment, each the non-inversion in-phase analog signal (BBI), the inversion in-phase analog signal (BBIB), the non-inversion quadrature analog signal (BBQ), and the inversion quadrature analog signal (BBQB) is a transmission baseband signal.

Each of the non-inversion in-phase RF signal (LOI), the inversion in-phase RF signal (LOIB), the non-inversion quadrature RF signal (LOQ), and the inversion quadrature RF signal (LOQB) is a transmission RF local signal.

In the most concrete embodiment, each of the first transistor, the second transistor, the third transistor, the fourth transistor, the fifth transistor, the sixth transistor, the seventh transistor, and the eighth transistor is any one of a MOS transistor, a junction field effect transistor, a bipolar transistor, a heterojunction bipolar transistor, and a high-electron-mobility transistor.

[2] Another representative embodiment in another point of view of the present invention provides a semiconductor integrated circuit (311) including a reception circuit (303) and a transmission circuit (304).

The transmission circuit includes first and second D/A converters (304I and Q), first and second low-pass filters (305I and Q), a quadrature modulator (306), a synthesizer (307), and a transmission amplifier (308).

The first and second D/A converters (304I and Q) can convert first and second transmission digital baseband signals into first and second transmission analog baseband signals.

The first and second low-pass filters (305I and Q) can transmit the first and second transmission analog baseband signals to the quadrature modulator (306).

The synthesizer (307) can supply first and second RF local signals to the quadrature modulator.

Figure 7:
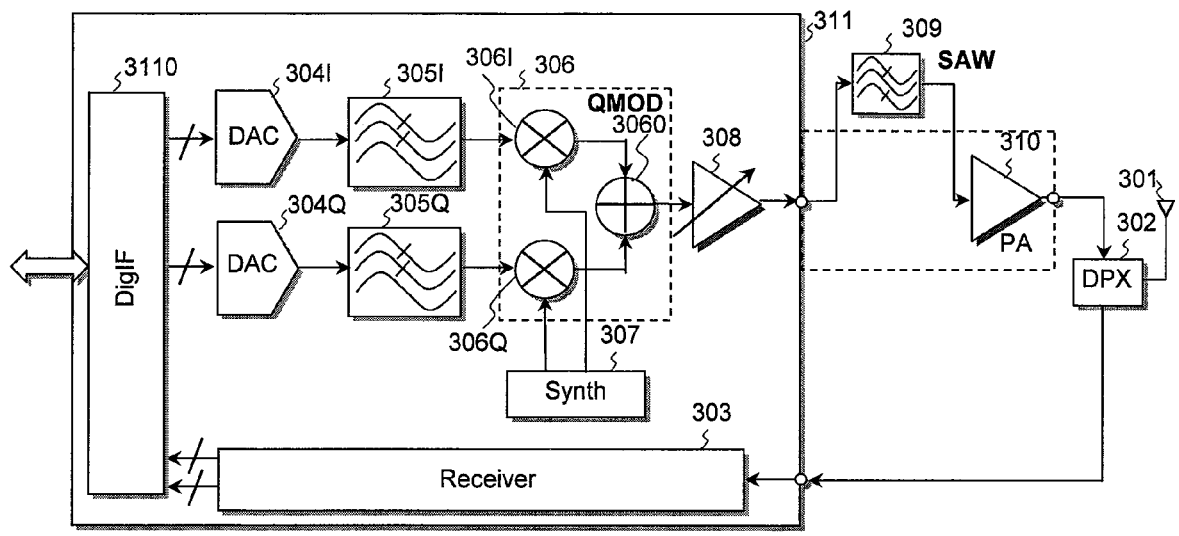
FIG. 7 is a diagram for showing a configuration of a transceiver in which an RF semiconductor integrated circuit (RFIC) examined by the inventers prior to the present invention is mounted, and showing a configuration of a transceiver in which the RFIC according the first embodiment of the present invention is mounted.

The quadrature modulator (306) can generate an RF transmission signal as an output, and the transmission amplifier (308) can amplify the RF transmission signal generated from the quadrature modulator (see FIG. 7).

The quadrature modulator (306) includes a first transistor (M1), a second transistor (M2), a third transistor (M3), a fourth transistor (M4), a first node (N1), a second node (N2), and a first output node (Nout).

Each of the first transistor, the second transistor, the third transistor, and the fourth transistor includes an input electrode, an output electrode, and a control electrode, and a conductive level between the input electrode and the output electrode can be controlled in response to control voltage supplied to the control electrode.

A non-inversion in-phase analog signal (BBI), an inversion in-phase analog signal (BBIB), a non-inversion quadrature analog signal (BBQ), and an inversion quadrature analog signal (BBQB) can be supplied to the input electrode of the first transistor (M1), the input electrode of the second transistor (M2), the input electrode of the third transistor (M3), and the input electrode of the fourth transistor (M4), respectively.

The control electrode of the first transistor (M1), the control electrode of the second transistor (M2), the control electrode of the third transistor (M3), and the control electrode of the fourth transistor (M4) can respond to a non-inversion in-phase RF signal (LOI), an inversion in-phase RF signal (LOIB), a non-inversion quadrature RF signal (LOQ), and an inversion quadrature RF signal (LOQB), respectively.

The output electrode of the first transistor (M1) and the output electrode of the second transistor (M2) are coupled to the first node (N1), and the output electrode of the third transistor (M3) and the output electrode of the fourth transistor (M4) are coupled to the second node (N2).

A first high-pass filter (HPF1) coupled between the first node (N1) and the first output node (Nout) and a second high-pass filter (HPF2) coupled between the second node (N2) and the first output node (Nout) are further provided (see FIG. 1).

2. Further Detailed Description of the Preferred Embodiments

Next, the embodiments will be further described in more detail. It should be noted that in the all drawings for explaining preferred embodiments for carrying out the present invention, constituent components having the same functions as the drawings mentioned above are given the same reference numerals, and the explanations thereof will not be repeated.

First Embodiment

<<Configuration of Transceiver>>

FIG. 7 is a diagram for showing a configuration of a transceiver in which an RF semiconductor integrated circuit (RFIC) according to a first embodiment of the present invention is mounted.

The following is a difference between the RFIC according to the first embodiment of the present invention shown in FIG. 7 and the RFIC which was described at the beginning and examined by the inventors prior to the present invention.

Specifically, a quadrature modulator (QMOD) 306 included in the RFIC according to the first embodiment of the present invention shown in FIG. 7 is configured using a passive mixer according to any one of a second embodiment shown in FIG. 1, a third embodiment shown in FIG. 2, a fourth embodiment shown in FIG. 3, a fifth embodiment shown in FIG. 4, a sixth embodiment shown in FIG. 5, and a seventh embodiment shown in FIG. 6, as will be described below. As a result, short circuit of an in-phase baseband transmission signal and a quadrature baseband transmission signal between a first node N1 and a second node N2 through an output node Nout in the frequency bands of DC (Direct Current) and a transmission baseband signal can be resolved in the quadrature modulator (QMOD) 306 configured as described above. At this time, an in-phase RF transmission signal generated from the first node N1 and a quadrature RF transmission signal generated from the second node N2 can be transmitted to the output node Nout at sufficient signal levels.

It should be noted that configurations of D/A converters 304I and 304Q, low-pass filters 305I and 305Q, a synthesizer 307, a programmable gain amplifier 308, a receiver 303, and a digital interface (DigIF) 3110 of the RFIC according to the first embodiment of the present invention shown in FIG. 7 are the same as those of the RFIC which was described at the beginning and examined by the inventors prior to the present invention, and thus the explanations thereof will not be repeated.

Further, configurations of a SAW filter 309, an RF power amplifier 310, a duplexer 302, and an antenna 301 according to the first embodiment of the present invention shown in FIG. 7 are the same as those described at the beginning, and thus the explanations thereof will not be repeated. In addition, the RFIC according to the first embodiment of the present invention shown in FIG. 7 supports transmission and reception in multiple bands of the WCDMA system. An RF transmission frequency is set lower than an RF reception frequency in each of multiple bands in accordance with the frequency division duplex (FDD).

Second Embodiment

FIG. 1 is a diagram for showing a configuration of a passive mixer according to a second embodiment of the present invention which can be used as the quadrature modulator (QMOD) 306 included in the RFIC according to the first embodiment of the present invention shown in FIG. 7.

Figure 16:
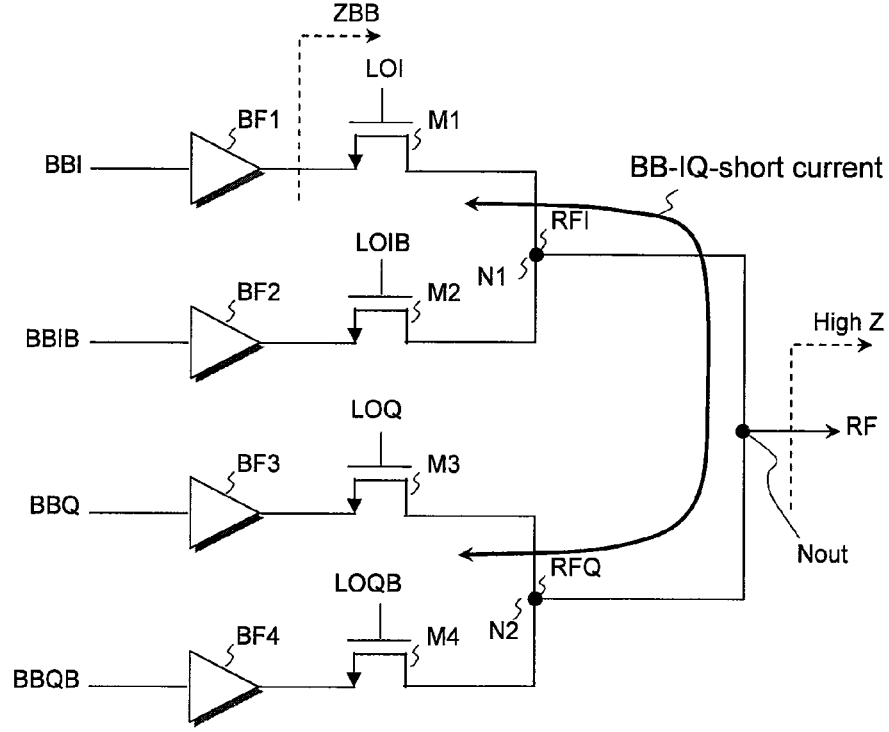
FIG. 16 is a diagram for showing a configuration of a passive mixer which was examined as the quadrature modulator (QMOD) 306 of the RF semiconductor integrated circuit (RFIC) by the inventors prior to the present invention shown in FIG. 7.
Figure 17:
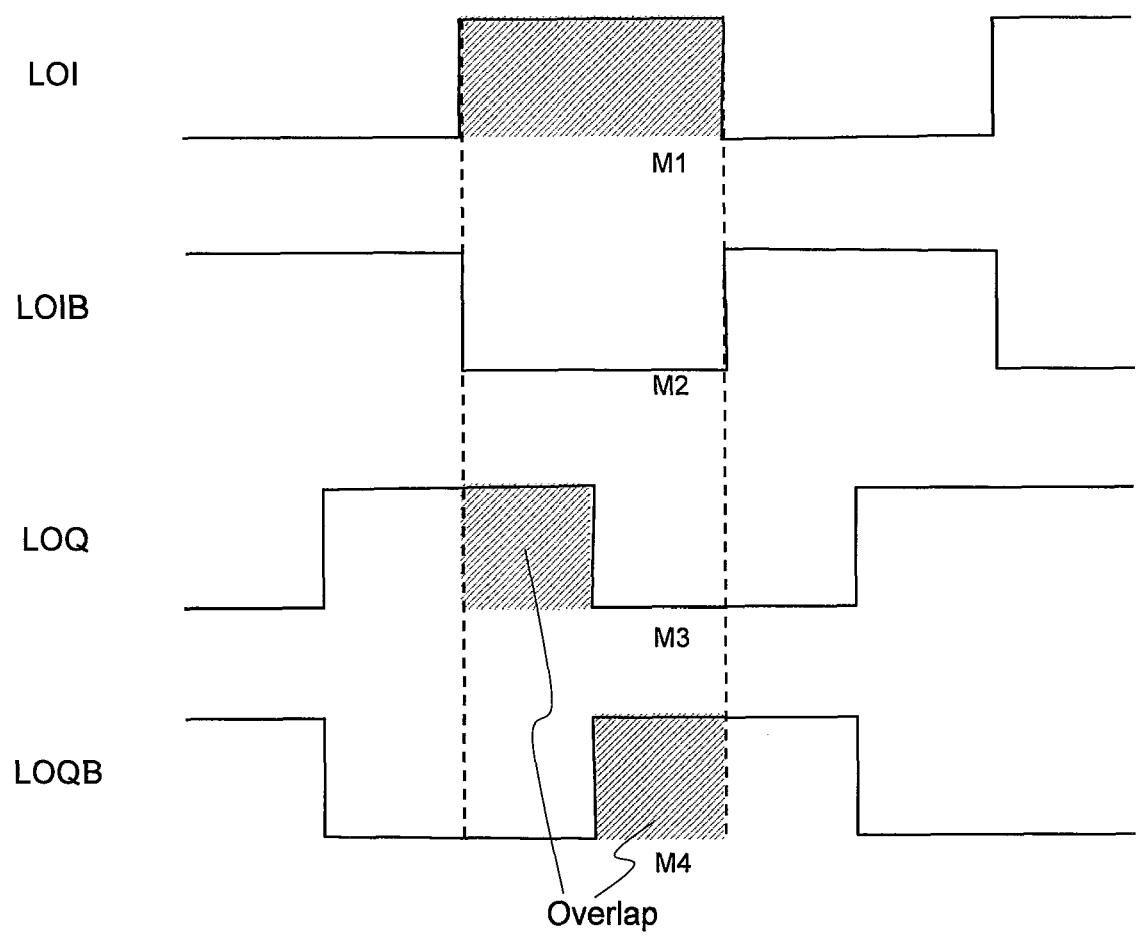
FIG. 17 is a diagram for showing waveforms for explaining an operation of the passive mixer shown in FIG. 16 as the quadrature modulator 306 which was examined by the inventors prior to the present invention.

The following is a difference between the passive mixer shown in FIG. 1 and the passive mixer shown in FIG. 16 which was examined by the inventors prior to the present invention.

Specifically, in the passive mixer shown in FIG. 1, the first node N1 is coupled to the output node Nout through a first high-pass filter HPF1 and the second node N2 is coupled to the output node Nout through a second high-pass filter HPF2, unlike the passive mixer shown in FIG. 16 in which the first node N1 and the second node N2 are directly coupled to the output node Nout through the first signal line and the second signal line, respectively. Further, each cut-off frequency of the first high-pass filter HPF1 and the second high-pass filter HPF2 is set at a value between the maximum frequency of a low-frequency baseband transmission signal and the minimum frequency of a high-frequency RF transmission signal.

Accordingly, in the passive mixer shown in FIG. 1, an impedance value between the first node N1 and the second node N2 becomes relatively large in the low-frequency band of the baseband transmission signal, and thus short circuit between the first node N1 and the second node N2 through the output node Nout in the frequency bands of DC (Direct Current) and the transmission baseband signal can be resolved. Thus, according to the passive mixer shown in FIG. 1, distortion of the signal waveform of an RF transmission signal RF generated from the output node Nout can be reduced, and the linearity of the passive mixer can be improved.

Further, according to the passive mixer of FIG. 1, the circuit for generating a 25%-duty-cycle LO necessary for the passive voltage mixer described in Non-patent Document 1 and the circuit for generating a double-frequency 2LO necessary for the passive voltage mixer described in Non-patent Document 2 are not necessary, and thus the power consumption of the passive mixer can be reduced.

On the other hand, in the passive mixer shown in FIG. 1, each impedance value of the first high-pass filter HPF1 and the second high-pass filter HPF2 becomes relatively small in the high-frequency band of the RF transmission signal. Accordingly, the in-phase RF transmission signal generated from the first node N1 and the quadrature RF transmission signal generated from the second node N2 can be transmitted to the output node Nout at sufficient signal levels.

As an example, the maximum frequency of the low-frequency baseband transmission signal of a mobile phone in the LTE system is 10 MHz, and the frequency of the high-frequency RF transmission signal in the UMTS band 1 is 1920 MHz to 1980 MHz. Accordingly, each cut-off frequency of the first and second high-pass filters HPF1 and HPF2 is set between the above values.

Further, since the passive mixer of FIG. 1 includes the first and second high-pass filters HPF1 and HPF2, input impedance in the low-frequency band of the baseband transmission signal viewed from the sources of four N-channel MOS transistors M1, M2, M3, and M4 can be improved. Accordingly, output impedance of four buffer amplifiers BF1 to BF4 which output the baseband transmission signals in the low-frequency band to the sources of the four N-channel MOS transistors M1 to M4 can be increased, and thus output driving current of the four buffer amplifiers BF1 to BF4 can be decreased, and the power consumption of the passive mixer can be reduced.

Third Embodiment

FIG. 2 is a diagram for showing a configuration of a passive mixer according to a third embodiment of the present invention which can be used as the quadrature modulator (QMOD) 306 included in the RFIC according to the first embodiment of the present invention shown in FIG. 7.

The following is a difference between the passive mixer according to the third embodiment shown in FIG. 2 and the passive mixer according to the second embodiment of the present invention shown in FIG. 1.

Specifically, four N-channel MOS transistors M1B, M2B, M3B, and M4B, a third high-pass filter HPF1B, and a fourth high-pass filter HPF2B which are not provided in the passive mixer shown in FIG. 1 are added to the passive mixer shown in FIG. 2.

A Non-inversion in-phase baseband signal output voltage output from the buffer amplifier BF1 and an inversion in-phase baseband signal output voltage output from the buffer amplifier BF2 are supplied to the common source of the transistors M1 and M1B and the common source of the transistors M2 and M2B, respectively. Further, a non-inversion quadrature baseband signal output voltage output from the buffer amplifier BF3 and an inversion quadrature baseband signal output voltage output from the buffer amplifier BF4 are supplied to the common source of the transistors M3 and M3B and the common source of the transistors M4 and M4B, respectively.

A non-inversion in-phase RF local signal voltage LOI and an inversion in-phase RF local signal voltage LOIB are supplied to the gate of the transistor M1 and the gate of the transistor M2, respectively, and the common drain thereof is coupled to the first node N1 from which a non-inversion in-phase RF transmission signal RFI is generated. Further, an inversion in-phase RF local signal voltage LOIB and a non-inversion in-phase RF local signal voltage LOI are supplied to the gate of the transistor M1B and the gate of the transistor M2B, respectively, and the common drain thereof is coupled to a third node N1B from which an inversion in-phase RF transmission signal RFIB is generated.

A non-inversion quadrature RF local signal voltage LOQ and an inversion quadrature RF local signal voltage LOQB are supplied to the gate of the transistor M3 and the gate of the transistor M4, respectively, and the common drain thereof is coupled to the second node N2 from which a non-inversion quadrature RF transmission signal RFQ is generated. Further, an inversion quadrature RF local signal voltage LOQB and a non-inversion quadrature RF local signal voltage LOQ are supplied to the gate of the transistor M3B and the gate of the transistor M4B, respectively, and the common drain thereof is coupled to a fourth node N2B from which an inversion quadrature RF transmission signal RFQB is generated.

The first node N1 and the second node N2 are coupled to a first output node Nout through the first high-pass filter HPF1 and the second high-pass filter HPF2, respectively, and a non-inversion RF transmission signal RF is generated from the first output node Nout. The third node N1B and the fourth node N2B are coupled to a second output node NoutB through the third high-pass filter HPF1B and the fourth high-pass filter HPF2B, respectively, and an inversion RF transmission signal RFB is generated from the second output node NoutB. The non-inversion RF transmission signal RF and the inversion RF transmission signal RFB are supplied to a differential input terminal of the programmable gain amplifier 308 of the RFIC according to the first embodiment of the present invention shown in FIG. 7. Each cut-off frequency of the first high-pass filter HPF1, the second high-pass filter HPF2, the third high-pass filter HPF1B, and the fourth high-pass filter HPF2B is set at a value between the maximum frequency of the low-frequency baseband transmission signal and the minimum frequency of the high-frequency RF transmission signal.

As compared to the passive mixer according to the first embodiment of the present invention shown in FIG. 1, the passive mixer according to the third embodiment shown in FIG. 2 is configured in a differential-type circuit system, and thus stability against fluctuations in power voltage and temperature can be improved, and in-phase signal components can be suppressed, which leads to realization of low noise.

Fourth Embodiment

Figure 3:
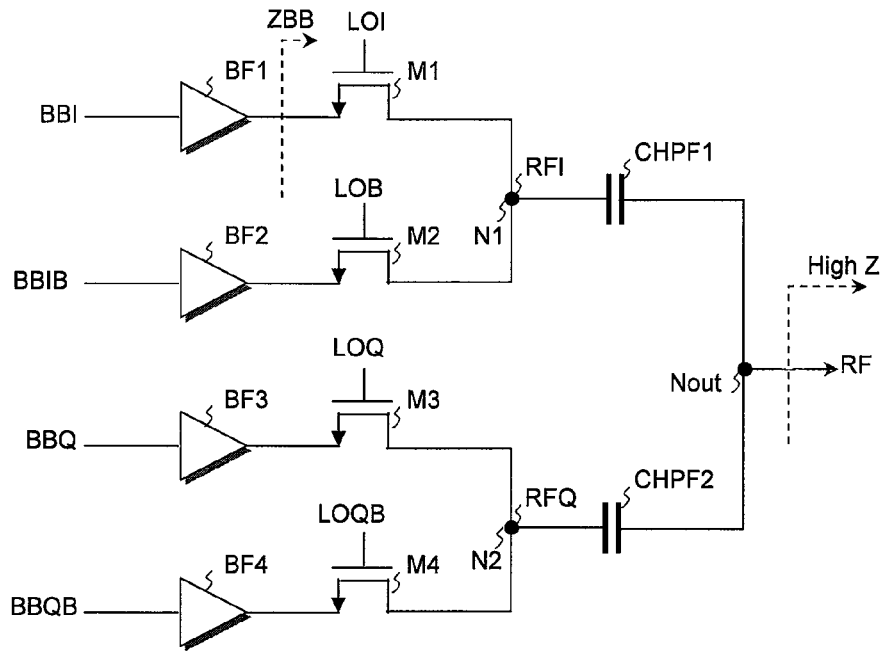
FIG. 3 is a diagram for showing a configuration of a passive mixer according to a fourth embodiment of the present invention which can be used as the quadrature modulator (QMOD) 306 included in the RFIC according to the first embodiment of the present invention shown in FIG. 7.

FIG. 3 is a diagram for showing a configuration of a passive mixer according to a fourth embodiment of the present invention which can be used as the quadrature modulator (QMOD) 306 included in the RFIC according to the first embodiment of the present invention shown in FIG. 7.

The following is a difference between the passive mixer according to the fourth embodiment shown in FIG. 3 and the passive mixer according to the second embodiment of the present invention shown in FIG. 1.

Specifically, in the passive mixer shown in FIG. 3, the first high-pass filter HPF1 of the passive mixer shown in FIG. 1 is configured using a capacitor CHPF1 and input impedance at the stage next to the output node Nout, and the second high-pass filter HPF2 of the passive mixer shown in FIG. 1 is configured using a capacitor CHPF2 and the input impedance at the stage next to the output node Nout. The input impedance at the stage next to the output node Nout corresponds to that of the programmable gain amplifier 308 of the RFIC according to the first embodiment of the present invention shown in FIG. 7.

Each cut-off frequency of the first and second high-pass filters HPF1 and HPF2 is determined based on the capacitance values of the capacitors CHPF1 and 2 and the input impedance at the stage next to the output node Nout. The capacitors CHPF1 and 2 as reactance elements are used for the first and second high-pass filters HPF1 and HPF2 so that thermal noise is suppressed, which leads to realization of low noise. Further, the capacitors CHPF1 and 2 can be formed on the semiconductor chip of the RFIC with a relatively small chip-occupied area, and thus the RFIC can be manufactured at low cost.

Fifth Embodiment

FIG. 4 is a diagram for showing a configuration of a passive mixer according to a fifth embodiment of the present invention which can be used as the quadrature modulator (QMOD) 306 included in the RFIC according to the first embodiment of the present invention shown in FIG. 7.

The following is a difference between the passive mixer according to the fifth embodiment of the present invention shown in FIG. 4 and the passive mixer according to the third embodiment of the present invention shown in FIG. 2.

Specifically, in the passive mixer shown in FIG. 4, the first high-pass filter HPF1 of the passive mixer shown in FIG. 2 is configured using the capacitor CHPF1 and the input impedance at the stage next to the first output node Nout, and the second high-pass filter HPF2 of the passive mixer shown in FIG. 2 is configured using the capacitor CHPF2 and the input impedance at the stage next to the first output node Nout. Further, in the passive mixer shown in FIG. 4, the third high-pass filter HPF1B of the passive mixer shown in FIG. 2 is configured using a capacitor CHPF1B and input impedance at the stage next to the second output node NoutB, and the fourth high-pass filter HPF2B of the passive mixer shown in FIG. 2 is configured using a capacitor CHPF2B and the input impedance at the stage next to the second output node NoutB. The input impedance at the stage next to the first output node Nout and the input impedance at the stage next to the second output node NoutB correspond to that of the programmable gain amplifier 308 of the RFIC according to the first embodiment of the present invention shown in FIG. 7.

Each cut-off frequency of the first, second, third, and fourth high-pass filters HPF1, 2, 3 and 4 is determined based on the capacitance values of the capacitors CHPF1, 2, 3, and 4 and the input impedance at the stages next to the output nodes Nout and NoutB.

Figures 9, 10:
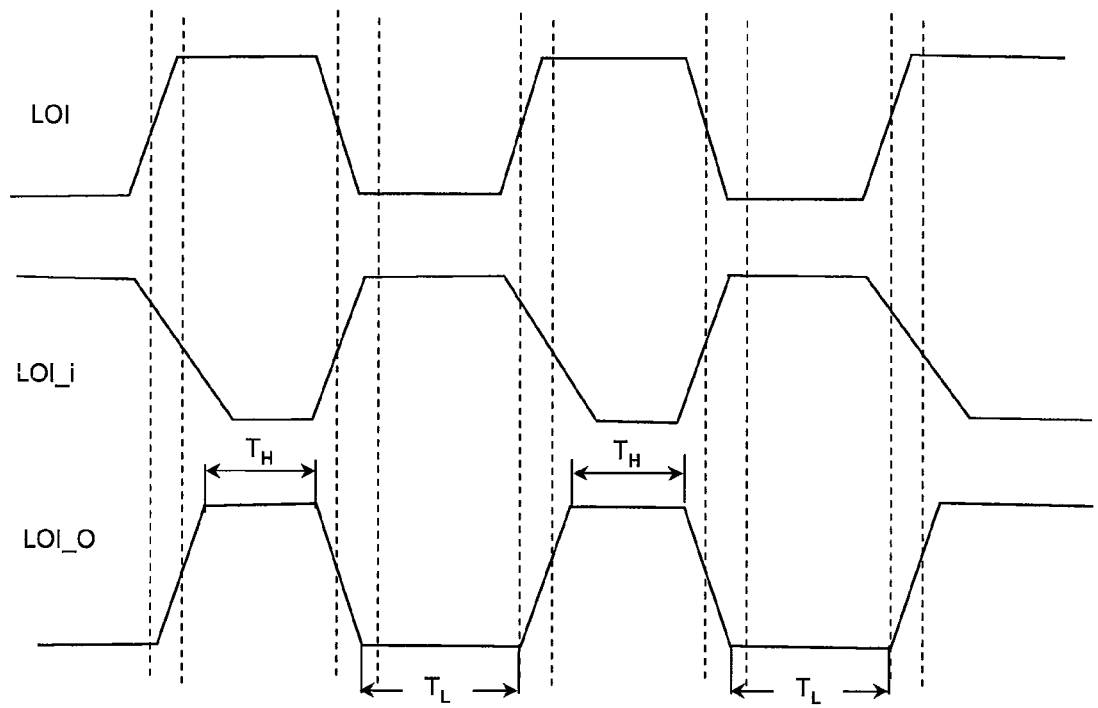
FIG. 9 is a diagram for showing waveforms of respective units of the local signal pulse-width reduction circuit LOPC according to the sixth embodiment of the present invention shown in FIG. 8.
FIG. 10 is a diagram for showing a result obtained by comparing input impedance among the driving method by a 25%-duty-cycle LO described in Non-patent Document 1, the driving method by a 50%-duty-cycle LO which was obtained by using the driving method by a 25%-duty-cycle LO as reference, and the passive mixer according to the fifth embodiment of the present invention shown in FIG. 4.

FIG. 10 is a diagram for showing a result obtained by comparing the input impedance among the driving method by a 25%-duty-cycle LO described in Non-patent Document 1, the driving method by a 50%-duty-cycle LO which was obtained by using the driving method by a 25%-duty-cycle LO as reference, and the passive mixer according to the fifth embodiment of the present invention shown in FIG. 4.

As shown in FIG. 10, while an input impedance ZBB is as extremely low as about 200 in the case of the 50% duty, the input impedance ZBB is increased to as extremely high as about 1100 in the case of the 25% duty and the input impedance ZBB is increased to as extremely high as about 2050 in the case of the fifth embodiment of the present invention shown in FIG. 4. It should be noted that the input impedance ZBB in this case corresponds to that in the low-frequency band of the baseband transmission signal viewed from the sources of the four N-channel MOS transistors M1, M2, M3, and M4, as described in the passive mixer according to the fifth embodiment of the present invention shown in FIG. 4. The comparison result shown in FIG. 10 was obtained by a simulation using a circuit model of an N-channel MOS transistor manufactured with a line width of 65 nm.

As described above, the input impedance of the passive mixer according to the fifth embodiment of the present invention shown in FIG. 4 becomes about 10 times higher as compared to the case of the conventional 50% duty, and becomes about two times higher as compared to the case of the conventional 25% duty. Accordingly, the input impedance can be considerably improved and low power consumption and high linear characteristics can be realized.

Figure 11:
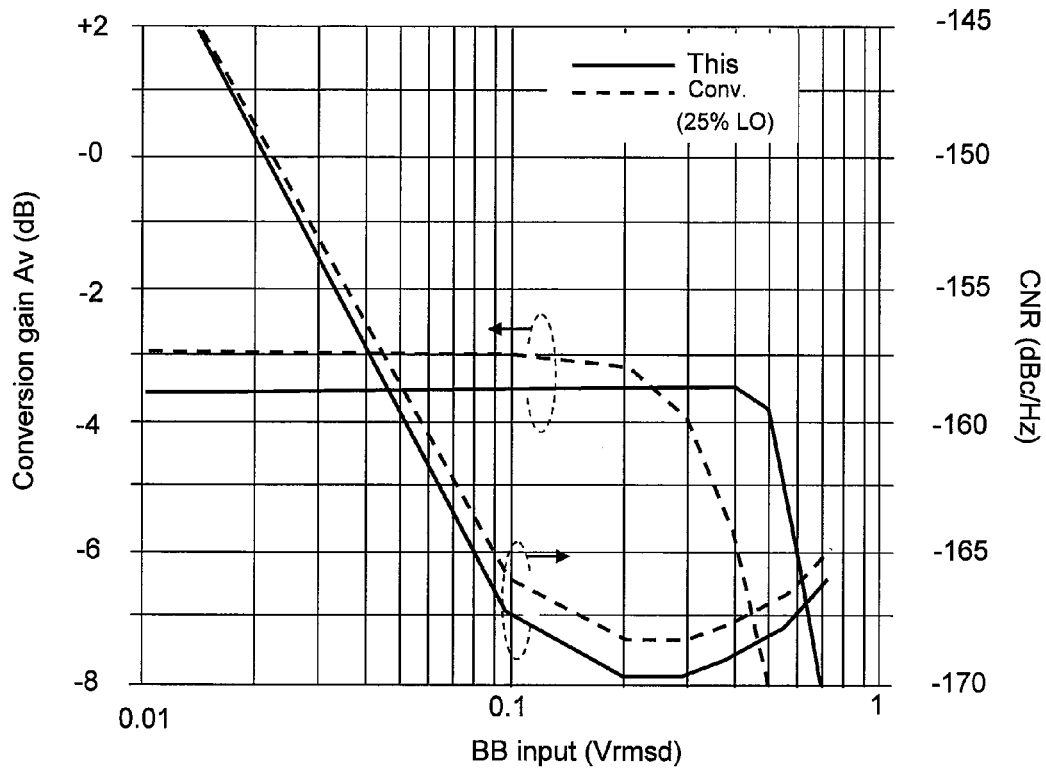
FIG. 11 is a diagram for showing a conversion gain Av of each of the driving method by a 25%-duty-cycle LO described in Non-patent Document 1 and the passive mixer according to the fifth embodiment of the present invention shown in FIG. 4 and dependency between a transmission baseband signal amplitude BBinput and a phase noise CNR.

FIG. 11 is a diagram for showing a conversion gain Av of each of the driving method by a 25%-duty-cycle LO described in Non-patent Document 1 and the passive mixer according to the fifth embodiment of the present invention shown in FIG. 4 and dependency between a transmission baseband signal amplitude BBinput and a phase noise CNR.

Figure 15:
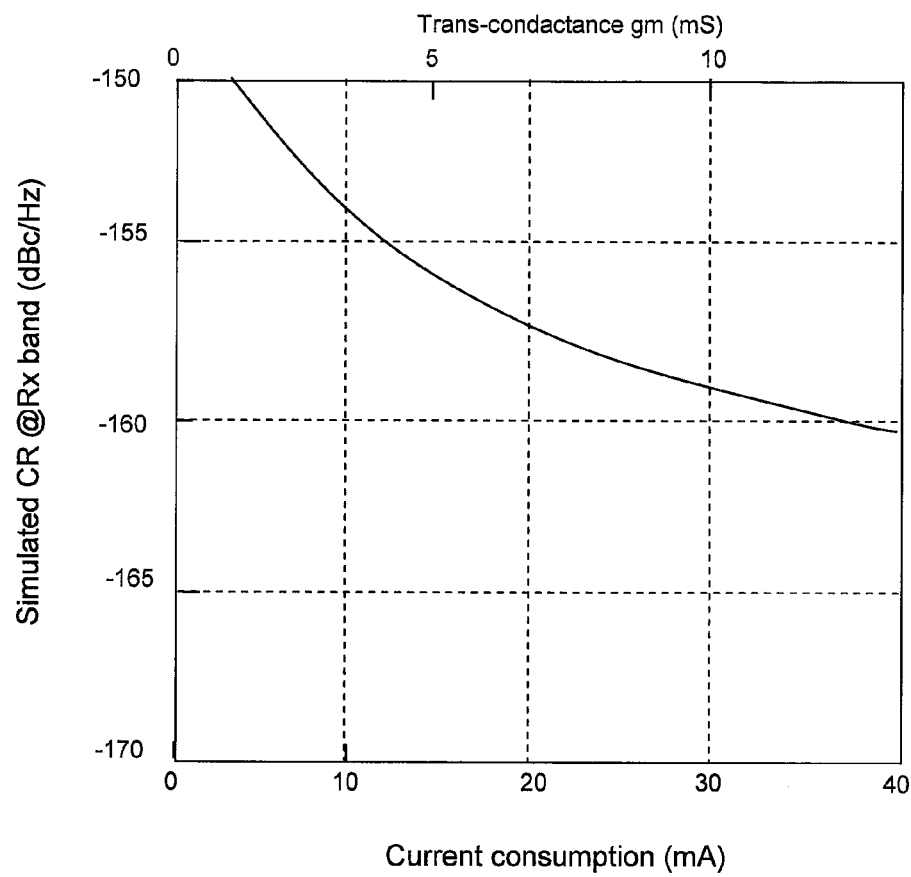
FIG. 15 is a diagram for showing noise characteristics of the gilbert mixer shown in FIG. 14 that is an active current mixer as the quadrature modulator 306 which was examined by the inventors prior to the present invention.

The transmission baseband signal amplitude BBinput on the horizontal axis in FIG. 11 represents the voltage amplitude of the transmission baseband signals of the output terminals of the buffer amplifiers BF1 to BF4 in the passive mixer shown in the FIG. 4. The conversion gain Av on the vertical axis on the left side of FIG. 11 corresponds to that from the input terminals of the buffer amplifiers BF1 to BF4 of the passive mixer in FIG. 4 to the non-inversion RF transmission signal RF and the inversion RF transmission signal RFB. The phase noise CNR on the vertical axis on the right side in FIG. 11 corresponds to the inverse number of an S/N ratio at the time of 120 MHz detuning as similar to the vertical axis in FIG. 15.

The conversion gain Av of the passive mixer shown in FIG. 4 is kept at a relatively large value for the transmission baseband signal amplitude BBinput with a high amplitude level, as compared to the case of the conventional 25% duty. Accordingly, the passive mixer of FIG. 4 has excellent linearity.

In terms of the phase noise CNR, the S/N ratio of the passive mixer of FIG. 4 is improved as compared to the case of the conventional 25% duty. Accordingly, the passive mixer of FIG. 4 has low noise characteristics.

Sixth Embodiment

Figure 5:
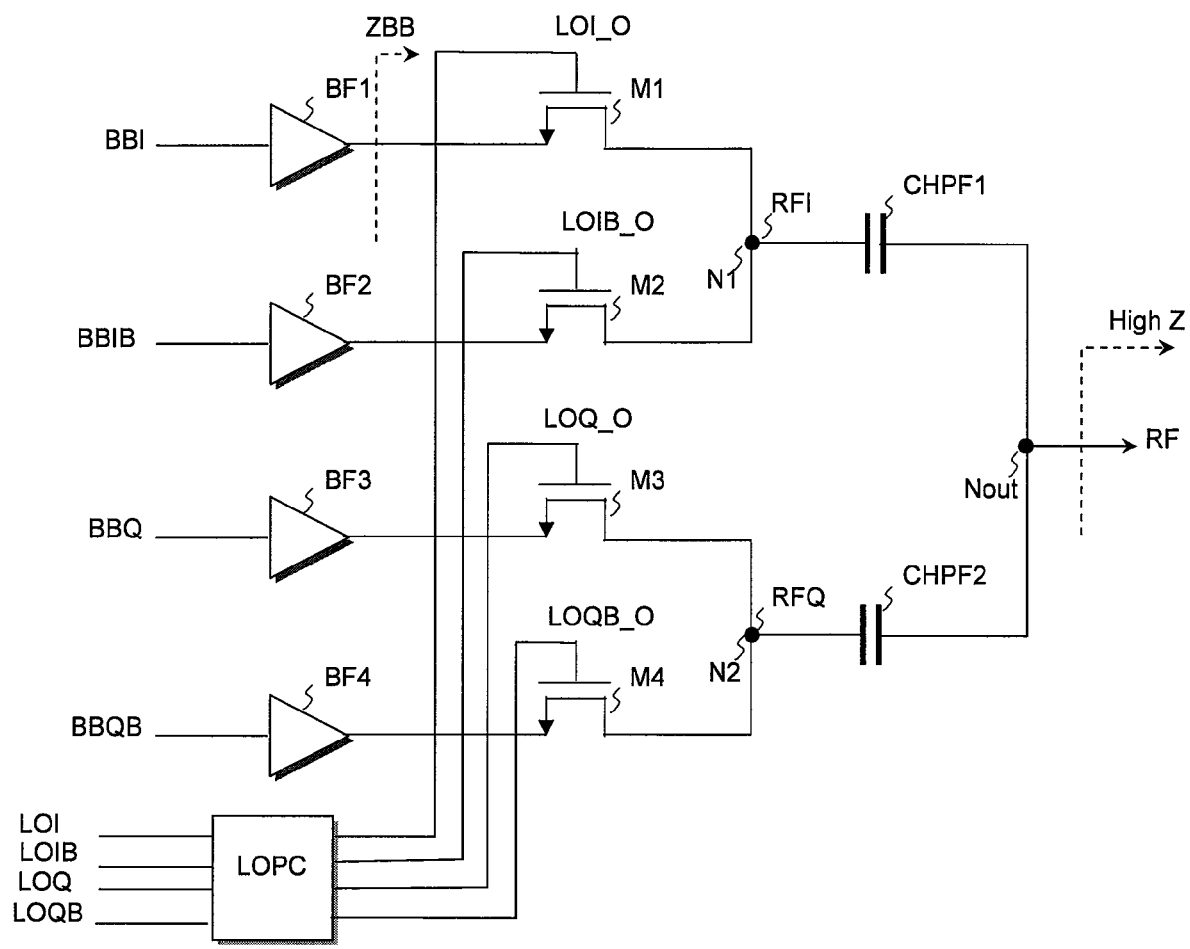
FIG. 5 is a diagram for showing a configuration of a passive mixer according to a sixth embodiment of the present invention which can be used as the quadrature modulator (QMOD) 306 included in the RFIC according to the first embodiment of the present invention shown in FIG. 7.

FIG. 5 is a diagram for showing a configuration of a passive mixer according to a sixth embodiment of the present invention which can be used as the quadrature modulator (QMOD) 306 included in the RFIC according to the first embodiment of the present invention shown in FIG. 7.

The following is a difference between the passive mixer according to the sixth embodiment of the present invention shown in FIG. 5 and the passive mixer according to the fourth embodiment of the present invention shown in FIG. 3.

Specifically, a local signal pulse-width reduction circuit LOPC which is not included in the passive mixer shown in FIG. 3 is added to the passive mixer shown in FIG. 5. The non-inversion in-phase RF local signal voltage LOI, the inversion in-phase RF local signal voltage LOIB, the non-inversion quadrature RF local signal voltage LOQ, and the inversion quadrature RF local signal voltage LOQB are supplied to the local signal pulse-width reduction circuit LOPC, so that a pulse-width-converted output/non-inversion in-phase RF local signal voltage LOI_O, a pulse-width-converted output/inversion in-phase RF local signal voltage LOIB_O, a pulse-width-converted output/non-inversion quadrature RF local signal voltage LOQ_O, and a pulse-width-converted output/inversion quadrature RF local signal voltage LOQB_O are generated from the local signal pulse-width reduction circuit LOPC.

FIG. 12 is a diagram for showing waveforms of the non-inversion in-phase RF local signal voltage LOI, the inversion in-phase RF local signal voltage LOIB, the non-inversion quadrature RF local signal voltage LOQ, and the inversion quadrature RF local signal voltage LOQB which are supplied to the local signal pulse-width reduction circuit LOPC of the passive mixer according to the sixth embodiment of the present invention shown in FIG. 5, and waveforms of the pulse-width-converted output/non-inversion in-phase RF local signal voltage LOI_O, the pulse-width-converted output/inversion in-phase RF local signal voltage LOIB_O, the pulse-width-converted output/non-inversion quadrature RF local signal voltage LOQ_O, and the pulse-width-converted output/inversion quadrature RF local signal voltage LOQB_O which are generated from the local signal pulse-width reduction circuit LOPC.

As shown on the upper side of FIG. 12, at a time X when the voltage level of the non-inversion in-phase RF local signal voltage LOI crosses over the voltage level of the inversion in-phase RF local signal voltage LOIB, the both voltage levels exceed the threshold voltage level of the N-channel MOS transistor. As similar to the above, as shown on the upper side of FIG. 12, at the time X when the voltage level of the non-inversion quadrature RF local signal voltage LOQ crosses over the voltage level of the inversion quadrature RF local signal voltage LOQB, the both voltage levels exceed the threshold voltage level of the N-channel MOS transistor.

The non-inversion in-phase RF local signal voltage LOI, the inversion in-phase RF local signal voltage LOIB, the non-inversion quadrature RF local signal voltage LOQ, and the inversion quadrature RF local signal voltage LOQB having the waveforms shown on the upper side of FIG. 12 are supplied to the gates of the four N-channel MOS transistors M1, M2, M3, and M4 of the passive mixer, respectively, according to the fourth embodiment of the present invention shown in FIG. 3. Accordingly, in the passive mixer shown in FIG. 3, the transistor M1 to which the non-inversion in-phase baseband signal output voltage of the buffer amplifier BF1 is supplied and the transistor M2 to which the inversion in-phase baseband signal output voltage of the buffer amplifier BF2 is supplied are simultaneously turned on and driven at the time X of the crossover, and the transistor M3 to which the non-inversion quadrature baseband signal output voltage of the buffer amplifier BF3 is supplied and the transistor M4 to which the inversion quadrature baseband signal output voltage of the buffer amplifier BF4 is supplied are simultaneously turned on and drive at the time X of the crossover. Accordingly, in the passive mixer shown in FIG. 3, the transistors are simultaneously turned on, so that the input impedance of the non-inversion in-phase baseband signal and the inversion in-phase baseband signal in the low-frequency band viewed from the both sources of the two N-channel MOS transistors M1 and M2 is decreased, and the input impedance of the non-inversion quadrature baseband signal and the inversion quadrature baseband signal in the low-frequency band viewed from the both sources of the two N-channel MOS transistors M3 and M4 is decreased.

In the meantime, in the passive mixer shown in FIG. 5, the pulse-width-converted output/non-inversion in-phase RF local signal voltage LOI_O, the pulse-width-converted output/inversion in-phase RF local signal voltage LOIB_O, the pulse-width-converted output/non-inversion quadrature RF local signal voltage LOQ_O, and the pulse-width-converted output/inversion quadrature RF local signal voltage LOQB_O which are generated from the local signal pulse-width reduction circuit LOPC are supplied to the gates of the four N-channel MOS transistors M1, M2, M3, and M4, respectively.

As shown on the lower side of FIG. 12, in each of the pulse waveforms of the pulse-width-converted output/non-inversion in-phase RF local signal voltage LOI_O, the pulse-width-converted output/inversion in-phase RF local signal voltage LOIB_O, the pulse-width-converted output/non-inversion quadrature RF local signal voltage LOQ_O, and the pulse-width-converted output/inversion quadrature RF local signal voltage LOQB_O which are generated from the local signal pulse-width reduction circuit LOPC, a high-level period $T_H$ is set shorter than a low-level period $T_L$. Accordingly, as shown on the lower side of FIG. 12, at the time X when the voltage level of the pulse-width-converted output/non-inversion in-phase RF local signal voltage LOI_O crosses over the voltage level of the pulse-width-converted output/inversion in-phase RF local signal voltage LOIB_O, the both voltage levels become lower than the threshold voltage level of the N-channel MOS transistor. As similar to the above, as shown on the lower side of FIG. 12, at the time X when the voltage level of the pulse-width-converted output/non-inversion quadrature RF local signal voltage LOQ_O crosses over the voltage level of the pulse-width-converted output/inversion quadrature RF local signal voltage LOQB_O, the both voltage levels become lower than the threshold voltage level of the N-channel MOS transistor.

Accordingly, in the passive mixer shown in FIG. 5, the simultaneous on-states of the transistors M1 and M2 and the simultaneous on-states of the transistors M3 and M4 at the time X of the crossover can be resolved. As a result, in the passive mixer shown in FIG. 5, reduction in the input impedance of the non-inversion in-phase baseband signal and the inversion in-phase baseband signal in the low-frequency band viewed from the both sources of the two N-channel MOS transistors M1 and M2 can be resolved, and reduction in the input impedance of the non-inversion quadrature baseband signal and the inversion quadrature baseband signal in the low-frequency band viewed from the both sources of the two N-channel MOS transistors M3 and M4 can be also resolved.

<<Configuration of Local Signal Pulse-Width Reduction Circuit>>

FIG. 8 is a diagram for showing a configuration of the local signal pulse-width reduction circuit LOPC included in the passive mixer according to the sixth embodiment of the present invention shown in FIG. 5.

The local signal pulse-width reduction circuit LOPC shown in FIG. 8 includes an input inverter INV1 and an output inverter INV2. The input inverter INV1 is configured using a CMOS inverter including a P-channel MOS transistor PM1 and an N-channel MOS transistor NM1, and the output inverter INV2 is configured using a CMOS inverter including a P-channel MOS transistor PM2 and an N-channel MOS transistor NM2. Especially, while a channel length Ln of the N-channel MOS transistor NM1 is set longer as compared to a channel length Lp of the P-channel MOS transistor PM1 in the input inverter INV1, the channel length of the P-channel MOS transistor PM1 and the channel length Ln of the N-channel MOS transistor NM1 are set at substantially the same value in the output inverter INV2. As a result, the N-channel MOS transistor NM1 becomes high in the threshold voltage and low in current driving performance in the input inverter INV1, as compared to the P-channel MOS transistor PM1.

FIG. 9 is a diagram for showing waveforms of the respective units of the local signal pulse-width reduction circuit LOPC according to the sixth embodiment of the present invention shown in FIG. 8.

In response to the waveform of the non-inversion in-phase RF local signal voltage LOI on the upper side of FIG. 9, the input inverter INV1 generates the waveform of a non-inversion in-phase RF local signal intermediate voltage LOI_i shown in the middle of FIG. 9. In the input inverter INV1, since the N-channel MOS transistor NM1 is set high in the threshold voltage and low in current driving performance, the rising velocity is slower than the falling velocity in the waveform of the non-inversion in-phase RF local signal intermediate voltage LOI_i. The output inverter INV2 discriminates the low level and the high level of the non-inversion in-phase RF local signal intermediate voltage LOI_i having the asymmetric waveform from each other to generate the pulse-width-converted output/non-inversion in-phase RF local signal voltage LOI_O. As a result, the pulse-width-converted output/non-inversion in-phase RF local signal voltage LOIO has a short high-level period $T_H$ and a long low-level period $T_L$.

The other pulse-width-converted output/inversion in-phase RF local signal voltage LOIB_O, pulse-width-converted output/non-inversion quadrature RF local signal voltage LOQ_O, and pulse-width-converted output/inversion quadrature RF local signal voltage LOQB_O can be generated by supplying the inversion in-phase RF local signal voltage LOIB, the non-inversion quadrature RF local signal voltage LOQ, and the inversion quadrature RF local signal voltage LOQB to another local signal pulse-width reduction circuit that is configured similar to the local signal pulse-width reduction circuit LOPC shown in FIG. 8.

The passive mixer according to the sixth embodiment of the present invention shown in FIG. 5 is originally required to have two buffers for supplying the non-inversion in-phase RF local signal voltage LOI and the inversion in-phase RF local signal voltage LOIB to the gate of the transistor M1 and the gate of the transistor M2, respectively, and two buffers for supplying the non-inversion quadrature RF local signal voltage LOQ and the inversion quadrature RF local signal voltage LOQB to the gate of the transistor M3 and the gate of the transistor M4, respectively. The local signal pulse-width reduction circuit LOPC shown in FIG. 8 and other three local signal pulse-width reduction circuits are used in substitution for the four buffers, so that a chip-occupied area and power consumption can be prevented from being increased.

Seventh Embodiment

FIG. 6 is a diagram for showing a configuration of a passive mixer according to a seventh embodiment of the present invention which can be used as the quadrature modulator (QMOD) 306 included in the RFIC according to the first embodiment of the present invention shown in FIG. 7.

The passive mixer according to the seventh embodiment of the present invention shown in FIG. 6 is formed in such a manner that the passive mixer according to the sixth embodiment of the present invention shown in FIG. 5 is expanded to be configured as a differential circuit system, as similar to the configuration of the passive mixer shown in FIG. 4 which is obtained by expanding the passive mixer shown in FIG. 3 to be configured as a differential circuit system.

The pulse-width-converted output/non-inversion in-phase RF local signal voltage LOI_O, the pulse-width-converted output/inversion in-phase RF local signal voltage LOIB_O, the pulse-width-converted output/non-inversion quadrature RF local signal voltage LOQ_O, and the pulse-width-converted output/inversion quadrature RF local signal voltage LOQB_O which are shown on the lower side of FIG. 12 are used also in the passive mixer shown in FIG. 6.

Accordingly, the simultaneous on-states of the plural transistors at the time X of the crossover can be resolved also in the passive mixer shown in FIG. 6. As a result, reduction in the input impedance of the non-inversion quadrature baseband signal and the inversion quadrature baseband signal in the low-frequency band can be resolved also in the passive mixer shown in FIG. 6.

Figure 13:
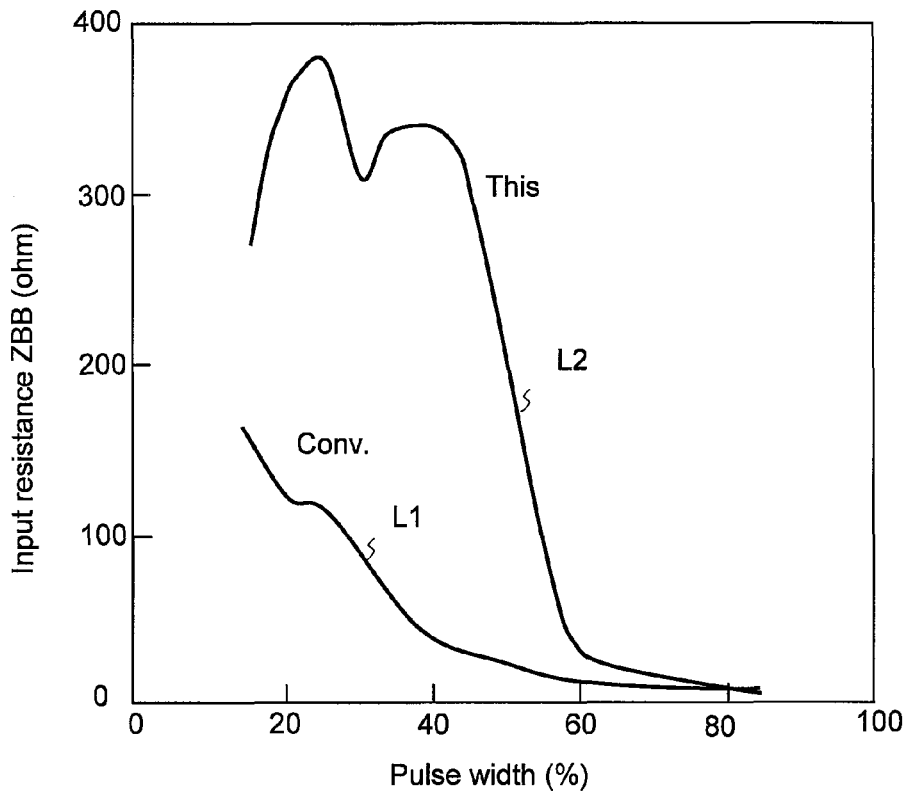
FIG. 13 is a diagram for showing a result obtained by comparing input impedance among the driving method by a 25%-duty-cycle LO described in Non-patent Document 1, the driving method by a 50%-duty-cycle LO which was obtained by using the driving method by a 25%-duty-cycle LO as reference, and the passive mixer according to the seventh embodiment of the present invention shown in FIG. 6.
Figure 14:
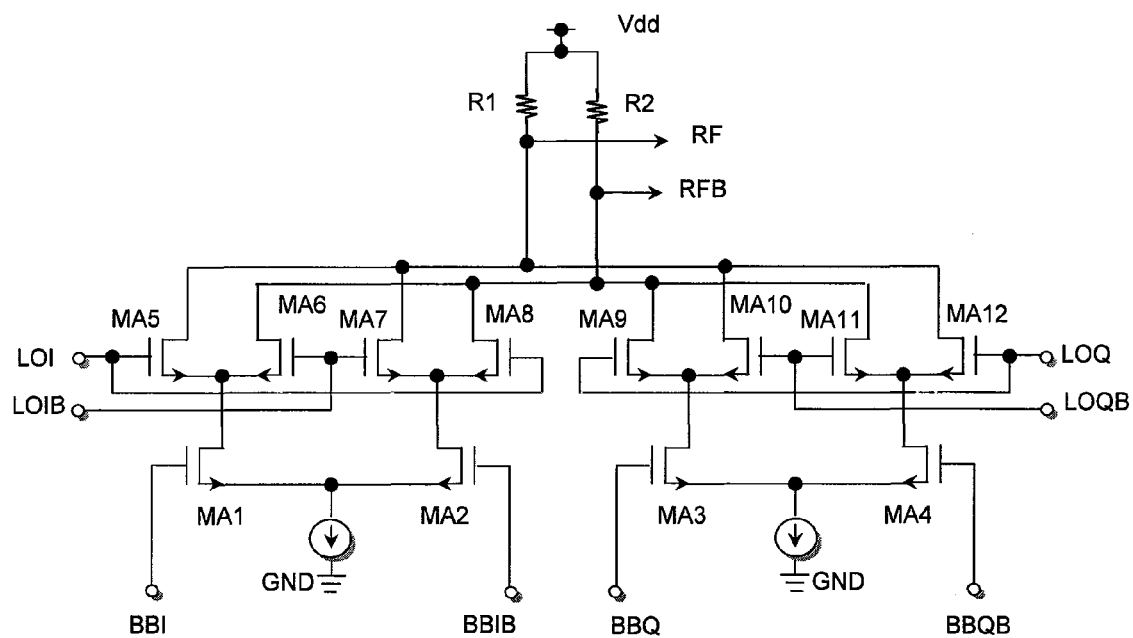
FIG. 14 is a diagram for showing a configuration of a gilbert mixer that is an active current mixer which was examined as the quadrature modulator (QMOD) 306 of the RF semiconductor integrated circuit (RFIC) by the inventors prior to the present invention shown in FIG. 7.

FIG. 13 is a diagram for showing a result obtained by comparing the input impedance among the driving method by a 25%-duty-cycle LO described in Non-patent Document 1, the driving method by a 50%-duty-cycle LO which was obtained by using the driving method by a 25%-duty-cycle LO as reference, and the passive mixer according to the seventh embodiment of the present invention shown in FIG. 6.

As shown in FIG. 13, the input impedance ZBB (characteristic L2) of the passive mixer according to the seventh embodiment of the present invention shown in FIG. 6 can be made extremely higher than that (characteristic L1) of any one of the conventional 50% duty and 25% duty. It should be noted that the value of the input impedance ZBB corresponds to that of the baseband transmission signal in the low-frequency band viewed from the sources of the plural N-channel MOS transistors. Further, the comparison result of FIG. 13 was obtained by a simulation using a circuit model of an N-channel MOS transistor manufactured with a line width of 65 nm.

Other Embodiments

The invention achieved by the inventors has been concretely described above on the basis of the various embodiments. However, it is obvious that the present invention is not limited to the above-described embodiments, but can be variously changed within a scope not departing from the gist of the present invention.

For example, it is obvious that the transceiver in which the RF semiconductor integrated circuit (RFIC) according to the first embodiment of the present invention shown in FIG. 7 is mounted can be applied to not only transmission and reception in a mobile phone in the WCDMA system, but also transmission and reception in a mobile phone in the GSM system. In this case, the duplexer 302 is replaced by an antenna switch which switches a transmission time slot and a reception time slot in the time division duplex (TDD) system.

In the transmission time slot, the RF transmission signal of the RF power amplifier 310 is transmitted to a base station of the mobile phone through the antenna switch 302 and the antenna 301. In the reception time slot, a reception signal which is transmitted from the base station of the mobile phone and is received by the antenna 301 is supplied to an input terminal of a low-noise amplifier (LNA) of the receiver 303 through the antenna switch 302.

Further, it is obvious that the transceiver in which the RF semiconductor integrated circuit (RFIC) according to the first embodiment of the present invention shown in FIG. 7 is mounted can be applied to not only transmission and reception in a mobile phone, but also transmission and reception in wireless communications through a wireless LAN (Local Area Network) compliant with the standard IEEE802.11a, b, g, n, or the like. In this case, since the RF transmission power of the RF power amplifier 310 is lower than that in the case of a mobile phone, the RF power amplifier 310 can be integrated into a semiconductor chip of the RFIC 311.

Moreover, the transistors to which the transmission baseband signal voltage and the RF local signal voltage are supplied in the passive mixers according to the second embodiment shown in FIG. 1, the third embodiment shown in FIG. 2, the fourth embodiment shown in FIG. 3, the fifth embodiment shown in FIG. 4, the sixth embodiment shown in FIG. 5, and the seventh embodiment shown in FIG. 6 are not limited to N-channel MOS transistors.

In addition, each transistor of the passive mixers can be replaced by a junction field effect transistor, a bipolar transistor, a heterojunction bipolar transistor, a high-electron-mobility transistor (HEMT), or the like instead of the N-channel MOS transistor. Further, it is obvious that the transistors may be of not only an N-channel conductive type, but also a P-channel conductive type, and of not only an NPN type, but also a PNP type.

What is claimed is:

1. A quadrature modulator comprising:
a first transistor;
a second transistor;
a third transistor;
a fourth transistor;
a fifth transistor;
a sixth transistor;
a seventh transistor;
an eighth transistor;
a first node;

a second node;
a third node;
a fourth node;
a first output node; and
a second output node,
wherein each of the first transistor, the second transistor, the third transistor, and the fourth transistor comprises an input electrode, an output electrode, and a control electrode, and a conductive level between the input electrode and the output electrode can be controlled in response to control voltage supplied to the control electrode,
wherein a non-inversion in-phase analog signal, an inversion in-phase analog signal, a non-inversion quadrature analog signal, and an inversion quadrature analog signal can be supplied to the input electrode of the first transistor, the input electrode of the second transistor, the input electrode of the third transistor, and the input electrode of the fourth transistor, respectively,
wherein the control electrode of the first transistor, the control electrode of the second transistor, the control electrode of the third transistor, and the control electrode of the fourth transistor can respond to a non-inversion in-phase RF signal, an inversion in-phase RF signal, a non-inversion quadrature RF signal, and an inversion quadrature RF signal, respectively,
wherein the output electrode of the first transistor and the output electrode of the second transistor are coupled to the first node, and the output electrode of the third transistor and the output electrode of the fourth transistor are coupled to the second node,
wherein the quadrature modulator further comprises: a first high-pass filter coupled between the first node and the first output node; and a second high-pass filter coupled between the second node and the first output node,
wherein each of the fifth transistor, the sixth transistor, the seventh transistor, and the eighth transistor comprises an input electrode, an output electrode, and a control electrode, and a conductive level between the input electrode and the output electrode can be controlled in accordance with control voltage supplied to the control electrode,
wherein the non-inversion in-phase analog signal, the inversion in-phase analog signal, the non-inversion quadrature analog signal, and the inversion quadrature analog signal can be supplied to the input electrode of the fifth transistor, the input electrode of the sixth transistor, the input electrode of the seventh transistor, and the input electrode of the eighth transistor, respectively,
wherein the control electrode of the fifth transistor, the control electrode of the sixth transistor, the control electrode of the seventh transistor, and the control electrode of the eighth transistor can respond to the inversion in-phase RF signal, the non-inversion in-phase RF signal, the inversion quadrature RF signal, and the non-inversion quadrature RF signal, respectively,
wherein the output electrode of the fifth transistor and the output electrode of the sixth transistor are coupled to the third node, and the output electrode of the seventh transistor and the output electrode of the eighth transistor are coupled to the fourth node, and
wherein the quadrature modulator further comprises: a third high-pass filter coupled between the third node and the second output node; and a fourth high-pass filter coupled between the fourth node and the second output node.

2. The quadrature modulator according to claim 1, wherein the first high-pass filter comprises a first capacitor coupled between the first node and the first output node, the second high-pass filter comprises a second capacitor coupled between the second node and the first output node, the third high-pass filter comprises a third capacitor coupled between the third node and the second output node, and the fourth high-pass filter comprises a fourth capacitor coupled between the fourth node and the second output node.

3. The quadrature modulator according to claim 2, wherein each of the first high-pass filter, the second high-pass filter, the third high-pass filter, and the fourth high-pass filter has a cut-off frequency that is set between the maximum frequency of each of the non-inversion in-phase analog signal, the inversion in-phase analog signal, the non-inversion quadrature analog signal, and the inversion quadrature analog signal and the minimum frequency of each of the non-inversion in-phase RF signal, the inversion in-phase RF signal, the non-inversion quadrature RF signal, and the inversion quadrature RF signal.

4. The quadrature modulator according to claim 3, further comprising:
a waveform processing circuit to which the non-inversion in-phase RF signal, the inversion in-phase RF signal, the non-inversion quadrature RF signal, and the inversion quadrature RF signal can be supplied,
wherein the waveform processing circuit can generate a pulse-width-converted output/non-inversion in-phase RF signal voltage, a pulse-width-converted output/inversion in-phase RF signal voltage, a pulse-width-converted output/non-inversion quadrature RF signal voltage, and a pulse-width-converted output/inversion quadrature RF signal voltage in response to the non-inversion in-phase RF signal, the inversion in-phase RF signal, the non-inversion quadrature RF signal, and the inversion quadrature RF signal, respectively,
wherein a high-level period is set shorter than a low-level period in each of the pulse-width-converted output/non-inversion in-phase RF signal voltage, the pulse-width-converted output/inversion in-phase RF signal voltage, the pulse-width-converted output/non-inversion quadrature RF signal voltage, and the pulse-width-converted output/inversion quadrature RF signal voltage,
wherein the pulse-width-converted output/non-inversion in-phase RF signal voltage generated from the waveform processing circuit can be supplied to the control electrode of the first transistor and the control electrode of the sixth transistor,
wherein the pulse-width-converted output/inversion in-phase RF signal voltage generated from the waveform processing circuit can be supplied to the control electrode of the second transistor and the control electrode of the fifth transistor,
wherein the pulse-width-converted output/non-inversion quadrature RF signal voltage generated from the waveform processing circuit can be supplied to the control electrode of the third transistor and the control electrode of the eighth transistor, and
wherein the pulse-width-converted output/inversion quadrature RF signal voltage generated from the waveform processing circuit can be supplied to the control electrode of the fourth transistor and the control electrode of the seventh transistor.

5. The quadrature modulator according to claim 4,
wherein in the timing when the non-inversion in-phase voltage level of the pulse-width-converted output/non-inversion in-phase RF signal voltage crosses over the inversion in-phase voltage level of the pulse-width-converted output/inversion in-phase RF signal voltage, each of the non-inversion in-phase voltage level and the inversion in-phase voltage level is set lower than the threshold voltage of each of the first transistor, the sixth transistor, the second transistor, and the fifth transistor, and
wherein in the timing when the non-inversion quadrature voltage level of the pulse-width-converted output/non-inversion quadrature RF signal voltage crosses over the inversion quadrature voltage level of the pulse-width-converted output/inversion quadrature RF signal voltage, each of the non-inversion quadrature voltage level and the inversion quadrature voltage level is set lower than the threshold voltage of each of the third transistor, the eighth transistor, the fourth transistor, and the seventh transistor.

6. The quadrature modulator according to claim 5, further comprising:
a first buffer amplifier;
a second buffer amplifier;
a third buffer amplifier; and
a fourth buffer amplifier,
wherein the non-inversion in-phase analog signal can be supplied to the input electrode of the first transistor and the input electrode of the fifth transistor through the first buffer amplifier,
wherein the inversion in-phase analog signal can be supplied to the input electrode of the second transistor and the input electrode of the sixth transistor through the second buffer amplifier,
wherein the non-inversion quadrature analog signal can be supplied to the input electrode of the third transistor and the input electrode of the seventh transistor through the third buffer amplifier, and
wherein the inversion quadrature analog signal can be supplied to the input electrode of the fourth transistor and the input electrode of the eighth transistor through the fourth buffer amplifier.

7. The quadrature modulator according to claim 6,
wherein each of a non-inversion in-phase RF signal voltage generator, an inversion in-phase RF signal voltage generator, a non-inversion quadrature RF signal voltage generator, and an inversion quadrature RF signal voltage generator which generate the pulse-width-converted output/non-inversion in-phase RF signal voltage, the pulse-width-converted output/inversion in-phase RF signal voltage, the pulse-width-converted output/non-inversion quadrature RF signal voltage, and the pulse-width-converted output/inversion quadrature RF signal voltage, respectively, of the waveform processing circuit is configured using a CMOS inverter,
wherein the CMOS inverter of each of the signal voltage generators comprises a P-channel MOS transistor and an N-channel MOS transistor, and
wherein an output terminal of the CMOS inverter of the N-channel MOS transistor is set lower in current driving performance than that of the CMOS inverter of the P-channel MOS transistor.

8. The quadrature modulator according to claim 7,
wherein each of the non-inversion in-phase analog signal, the inversion in-phase analog signal, the non-inversion quadrature analog signal, and the inversion quadrature analog signal is a transmission baseband signal, and
wherein each of the non-inversion in-phase RF signal, the inversion in-phase RF signal, the non-inversion quadrature RF signal, and the inversion quadrature RF signal is a transmission RF local signal.

9. The quadrature modulator according to claim 8,
wherein each of the first transistor, the second transistor, the third transistor, the fourth transistor, the fifth transistor, the sixth transistor, the seventh transistor, and the eighth transistor is any one of a MOS transistor, a junction field effect transistor, a bipolar transistor, a heterojunction bipolar transistor, and a high-electron-mobility transistor.

10. A semiconductor integrated circuit comprising:
a transmission circuit which has first and second D/A converters, first and second low-pass filters, a quadrature modulator, a synthesizer, and a transmission amplifier,
wherein the first and second D/A converters can convert first and second transmission digital baseband signals into first and second transmission analog baseband signals,
wherein the first and second low-pass filters can transmit the first and second transmission analog baseband signals to the quadrature modulator,
wherein the synthesizer can supply first and second RF local signals to the quadrature modulator,
wherein the quadrature modulator can generate an RF transmission signal as an output, and the transmission amplifier can amplify the RF transmission signal generated from the quadrature modulator,
wherein the quadrature modulator comprises, a first transistor, a second transistor, a third transistor, a fourth transistor, a first node, a second node, and a first output node,
wherein each of the first transistor, the second transistor, the third transistor, and the fourth transistor comprises an input electrode, an output electrode, and a control electrode, and a conductive level between the input electrode and the output electrode can be controlled in response to control voltage supplied to the control electrode,
wherein a non-inversion in-phase analog signal, an inversion in-phase analog signal, a non-inversion quadrature analog signal, and an inversion quadrature analog signal can be supplied to the input electrode of the first transistor, the input electrode of the second transistor, the input electrode of the third transistor, and the input electrode of the fourth transistor, respectively,
wherein the control electrode of the first transistor, the control electrode of the second transistor, the control electrode of the third transistor, and the control electrode of the fourth transistor can respond to a non-inversion in-phase RF signal, an inversion in-phase RF signal, a non-inversion quadrature RF signal, and an inversion quadrature RF signal, respectively,
wherein the output electrode of the first transistor and the output electrode of the second transistor are coupled to the first node, and the output electrode of the third transistor and the output electrode of the fourth transistor are coupled to the second node,
wherein the semiconductor integrated circuit comprises: a first high-pass filter coupled between the first node and the first output node; and a second high-pass filter coupled between the second node and the first output node, wherein the quadrature modulator further comprises a fifth transistor, a sixth transistor, a seventh transistor, an eighth transistor, a third node, a fourth node, and a second output node, wherein each of the fifth transistor, the sixth transistor, the seventh transistor, and the eighth transistor comprises an input electrode, an output electrode, and a control electrode, and a conductive level between the input electrode and the output electrode can be controlled in accordance with control voltage supplied to the control electrode, wherein the non-inversion in-phase analog signal, the inversion in-phase analog signal, the non-inversion quadrature analog signal, and the inversion quadrature analog signal can be supplied to the input electrode of the fifth transistor, the input electrode of the sixth transistor, the input electrode of the seventh transistor, and the input electrode of the eighth transistor, respectively, wherein the control electrode of the fifth transistor, the control electrode of the sixth transistor, the control electrode of the seventh transistor, and the control electrode of the eighth transistor can respond to the inversion in-phase RF signal, the non-inversion in-phase RF signal, the inversion quadrature RF signal, and the non-inversion quadrature RF signal, respectively, wherein the output electrode of the fifth transistor and the output electrode of the sixth transistor are coupled to the third node, and the output electrode of the seventh transistor and the output electrode of the eighth transistor are coupled to the fourth node, and wherein the quadrature modulator further comprises a third high-pass filter coupled between the third node and the second output node and a fourth high-pass filter coupled between the fourth node and the second output node.

11. The semiconductor integrated circuit according to claim 10, wherein the first high-pass filter comprises a first capacitor coupled between the first node and the first output node, the second high-pass filter comprises a second capacitor coupled between the second node and the first output node, the third high-pass filter comprises a third capacitor coupled between the third node and the second output node, and the fourth high-pass filter comprises a fourth capacitor coupled between the fourth node and the second output node.

12. The semiconductor integrated circuit according to claim 11, wherein each of the first high-pass filter, the second high-pass filter, the third high-pass filter, and the fourth high-pass filter has a cut-off frequency that is set between the maximum frequency of each of the non-inversion in-phase analog signal, the inversion in-phase analog signal, the non-inversion quadrature analog signal, and the inversion quadrature analog signal and the minimum frequency of each of the non-inversion in-phase RF signal, the inversion in-phase RF signal, the non-inversion quadrature RF signal, and the inversion quadrature RF signal.

13. The semiconductor integrated circuit according to claim 12, wherein the quadrature modulator further comprises a waveform processing circuit to which the non-inversion in-phase RF signal, the inversion in-phase RF signal, the non-inversion quadrature RF signal, and the inversion quadrature RF signal can be supplied, wherein the waveform processing circuit can generate a pulse-width-converted output/non-inversion in-phase RF signal voltage, a pulse-width-converted output/inversion in-phase RF signal voltage, a pulse-width-converted output/non-inversion quadrature RF signal voltage, and a pulse-width-converted output/inversion quadrature RF signal voltage in response to the non-inversion in-phase RF signal, the inversion in-phase RF signal, the non-inversion quadrature RF signal, and the inversion quadrature RF signal, respectively, wherein a high-level period is set shorter than a low-level period in each of the pulse-width-converted output/non-inversion in-phase RF signal voltage, the pulse-width-converted output/inversion in-phase RF signal voltage, the pulse-width-converted output/non-inversion quadrature RF signal voltage, and the pulse-width-converted output/inversion quadrature RF signal voltage, wherein the pulse-width-converted output/non-inversion in-phase RF signal voltage generated from the waveform processing circuit can be supplied to the control electrode of the first transistor and the control electrode of the sixth transistor, wherein the pulse-width-converted output/inversion in-phase RF signal voltage generated from the waveform processing circuit can be supplied to the control electrode of the second transistor and the control electrode of the fifth transistor, wherein the pulse-width-converted output/non-inversion quadrature RF signal voltage generated from the waveform processing circuit can be supplied to the control electrode of the third transistor and the control electrode of the eighth transistor, and wherein the pulse-width-converted output/inversion quadrature RF signal voltage generated from the waveform processing circuit can be supplied to the control electrode of the fourth transistor and the control electrode of the seventh transistor.

14. The semiconductor integrated circuit according to claim 13, wherein in the timing when the non-inversion in-phase voltage level of the pulse-width-converted output/non-inversion in-phase RF signal voltage crosses over the inversion in-phase voltage level of the pulse-width-converted output/inversion in-phase RF signal voltage, each of the non-inversion in-phase voltage level and the inversion in-phase voltage level is set lower than the threshold voltage of each of the first transistor, the sixth transistor, the second transistor, and the fifth transistor, and wherein in the timing when the non-inversion quadrature voltage level of the pulse-width-converted output/non-inversion quadrature RF signal voltage crosses over the inversion quadrature voltage level of the pulse-width-converted output/inversion quadrature RF signal voltage, each of the non-inversion quadrature voltage level and the inversion quadrature voltage level is set lower than the threshold voltage of each of the third transistor, the eighth transistor, the fourth transistor, and the seventh transistor.

15. The semiconductor integrated circuit according to claim 14, wherein the quadrature modulator further comprises a first buffer amplifier, a second buffer amplifier, a third buffer amplifier, and a fourth buffer amplifier, wherein the non-inversion in-phase analog signal can be supplied to the input electrode of the first transistor and the input electrode of the fifth transistor through the first buffer amplifier, wherein the inversion in-phase analog signal can be supplied to the input electrode of the second transistor and the input electrode of the sixth transistor through the second buffer amplifier, wherein the non-inversion quadrature analog signal can be supplied to the input electrode of the third transistor and the input electrode of the seventh transistor through the third buffer amplifier, and wherein the inversion quadrature analog signal can be supplied to the input electrode of the fourth transistor and the input electrode of the eighth transistor through the fourth buffer amplifier.

16. The semiconductor integrated circuit according to claim 15, wherein each of a non-inversion in-phase RF signal voltage generator, an inversion in-phase RF signal voltage generator, a non-inversion quadrature RF signal voltage generator, and an inversion quadrature RF signal voltage generator which generate the pulse-width-converted output/non-inversion in-phase RF signal voltage, the pulse-width-converted output/inversion in-phase RF signal voltage, the pulse-width-converted output/non-inversion quadrature RF signal voltage, and the pulse-width-converted output/inversion quadrature RF signal voltage, respectively, of the waveform processing circuit is configured using a CMOS inverter, wherein the CMOS inverter of each of the signal voltage generators comprises a P-channel MOS transistor and an N-channel MOS transistor, and wherein an output terminal of the CMOS inverter of the N-channel MOS transistor is set lower in current driving performance than that of the CMOS inverter of the P-channel MOS transistor.

17. The semiconductor integrated circuit according to claim 16, wherein each of the non-inversion in-phase analog signal, the inversion in-phase analog signal, the non-inversion quadrature analog signal, and the inversion quadrature analog signal is a transmission baseband signal, and wherein each of the non-inversion in-phase RF signal, the inversion in-phase RF signal, the non-inversion quadrature RF signal, and the inversion quadrature RF signal is a transmission RF local signal.

18. The semiconductor integrated circuit according to claim 17, wherein each of the first transistor, the second transistor, the third transistor, the fourth transistor, the fifth transistor, the sixth transistor, the seventh transistor, and the eighth transistor is any one of a MOS transistor, a junction field effect transistor, a bipolar transistor, a heterojunction bipolar transistor, and a high-electron-mobility transistor.

* * * * *